US012077975B2

(12) United States Patent
Kensinger et al.

(10) Patent No.: US 12,077,975 B2
(45) Date of Patent: Sep. 3, 2024

(54) MOBILE TOWER FOR TRANSPORTATION AND REMOTE DEPLOYMENT

(71) Applicant: Tower Solutions, LLC, Mendota Heights, MN (US)

(72) Inventors: David George Kensinger, Rosemount, MN (US); Steven George Kensinger, Burnsville, MN (US)

(73) Assignee: Tower Solutions, LLC, Mendota Heights, MN (US)

( * ) Notice: Subject to any disclaimer, the term of this patent is extended or adjusted under 35 U.S.C. 154(b) by 0 days.

(21) Appl. No.: 18/202,797

(22) Filed: May 26, 2023

(65) Prior Publication Data
US 2023/0295948 A1   Sep. 21, 2023

Related U.S. Application Data

(63) Continuation of application No. 17/176,012, filed on Feb. 15, 2021, now Pat. No. 11,661,761, which is a
(Continued)

(51) Int. Cl.
*E04H 12/18* (2006.01)
*B66C 23/78* (2006.01)
(Continued)

(52) U.S. Cl.
CPC ........... *E04H 12/182* (2013.01); *B66C 23/78* (2013.01); *E04B 1/343* (2013.01);
(Continued)

(58) Field of Classification Search
CPC ..... E04H 12/182; E04H 12/187; E04H 12/20; E04H 12/344; E04H 12/34; E04B 1/343;
(Continued)

(56) References Cited

U.S. PATENT DOCUMENTS 4,899,500 A * 2/1990 Miller ..................... E04H 12/10
52/146
4,912,893 A * 4/1990 Miller ................. E04H 12/2238
52/143

(Continued)

*Primary Examiner* — Andrew J Triggs
(74) *Attorney, Agent, or Firm* — Robert C. Freed; Dykema Gossett PLLC

(57) ABSTRACT

A mobile tower for transportation to and rapid deployment at remote sites where the mobile tower can be engaged with the ground, the mobile tower including an extendable and retractable tower secured to a mobile support structure including a frame having a plurality of rapidly deployable outriggers, wherein the tower includes three series of pivotally interconnected tower sections or segments, sections or segments of which engage with segments of each of the other series when the tower is assembled; the mobile tower including a plurality of guy wires secured between the extendable and retractable tower and the respective outriggers to stabilize the tower after the tower is assembled. The guy wires are preferably secured to the extendable and retractable tower at first and second connecting positions that are displaced from one another about an outer perimeter. Methods of deploying the mobile tower are also disclosed.

19 Claims, 31 Drawing Sheets

Related U.S. Application Data continuation of application No. 16/353,715, filed on Mar. 14, 2019, now Pat. No. 10,920,444.

(60) Provisional application No. 62/646,756, filed on Mar. 22, 2018.

(51) Int. Cl.
 *E04B 1/343* (2006.01)
 *E04H 12/20* (2006.01)
 *E04H 12/34* (2006.01)

(52) U.S. Cl.
 CPC ....... *E04B 1/34305* (2013.01); *E04H 12/187* (2013.01); *E04H 12/20* (2013.01); *E04H 12/34* (2013.01); *E04H 12/344* (2013.01); *E04B 1/34312* (2023.08)

(58) Field of Classification Search
 CPC .. E04B 1/34305; E04B 1/34312; B66C 23/78
 See application file for complete search history.

(56) References Cited

U.S. PATENT DOCUMENTS

| | | | | |
|---|---|---|---|---|
| 5,531,419 | A * | 7/1996 | Gustafsson | H01Q 1/1235 343/882 |
| 7,062,883 | B1 * | 6/2006 | Langholz | E04H 12/20 52/110 |
| 7,089,705 | B1 * | 8/2006 | Lieberman | E04H 12/20 52/146 |
| 8,522,511 | B2 * | 9/2013 | Thoren | H01Q 1/1235 52/745.18 |
| 8,950,125 | B2 * | 2/2015 | Kensinger | E04C 3/32 52/114 |
| 9,309,661 | B2 * | 4/2016 | Kensinger | E04B 1/34363 |
| 9,719,244 | B2 * | 8/2017 | Kensinger | E04C 3/32 |
| 10,030,379 | B2 * | 7/2018 | Kensinger | E04H 12/187 |
| 10,604,928 | B2 * | 3/2020 | Kensinger | F16M 11/38 |
| 10,920,444 | B2 * | 2/2021 | Kensinger | E04H 12/187 |
| 10,975,563 | B2 * | 4/2021 | Kensinger | F16M 11/38 |
| 11,661,761 | B2 * | 5/2023 | Kensinger | E04H 12/10 52/118 |
| 2023/0295948 | A1 * | 9/2023 | Kensinger | B66C 23/78 52/118 |

* cited by examiner

MOBILE TOWER FOR TRANSPORTATION AND REMOTE DEPLOYMENT

CROSS-REFERENCE TO RELATED APPLICATIONS

This application is a continuation of U.S. patent application Ser. No. 17/176,012, pending, entitled "Mobile Tower For Transportation And Remote Deployment", which is a continuation of U.S. patent application Ser. No. 16/353,715, filed Mar. 14, 2019, entitled "Mobile Tower For Transportation And Remote Deployment", now issued as U.S. Pat. No. 10,920,444, which claims priority benefit, under 35 U.S.C. § 119(e), of U.S. Provisional Patent Application No. 62/646,756, filed Mar. 22, 2018, entitled "Mobile Tower For Transportation And Remote Deployment", which are incorporated herein by reference in its entirety. The present application is related to U.S. patent application Ser. No. 09/960,537, filed Sep. 21, 2001, now issued as U.S. Pat. No. 7,310,915, and U.S. patent application Ser. No. 10/826,867, filed Apr. 16, 2004, now issued as U.S. Pat. No. 7,357,365, and U.S. patent application Ser. No. 13/282,994, filed Oct. 27, 2011, now issued as U.S. Pat. No. 8,950,125, the disclosures of each of which are hereby incorporated herein by reference.

FIELD OF THE INVENTION

The present invention relates to support columns, and specifically to improved extendable and retractable towers, and more specifically to a tower which can be rapidly deployed, and having a support system for the tower, and an arrangement for such tower with support system to be mobile and deployable at remote locations.

BACKGROUND OF THE DISCLOSURE

Tower structures for delivery to and erection at remote sites are known in the art. Structures of this kind may be used to form an elevated platform for support of equipment or a person.

Mobile towers may be utilized for surveillance, as telecommunications towers, as supports for temporary lighting systems, or the like. In general, mobile towers may be used for any application where it is desired to provide a support for a person or equipment at an elevated location relative to its surroundings.

Although existing mobile towers have been satisfactory for some applications, various shortcomings have limited their utility. For example, existing towers are often bulky, heavy and challenging to transport. This affects their ability to be delivered to remote locations. After successfully transporting a tower to a remote location, it can take upwards of 1-2 hours or longer to or erect. This presents a significant drawback where time is of the essence, such as in the wake of a natural disaster where critical services such as emergency communications need to be immediately reestablished or when monitoring a hostile, armed enemy under wartime conditions. Often, existing mobile towers will not be able to support a required payload or withstand wind loads. Once an existing mobile tower has been erected and is operational, there is usually nothing to protect the internal mechanical and electrical components from the environment, animals, etc. over what may be an extended time period. This is a drawback where an extendable and retractable tower must operate autonomously and is deployed for an extended period of time in a remote location. With existing mobile towers, it often takes as much time to lower or retract the tower as it does to erect it. This generally makes deployment and redeployment a long and time consuming process. This also presents a significant drawback because a tower may need to be refitted with different sensors, antennas, lighting, etc. or the tower may be in imminent danger of capture or destruction from a hostile enemy. Accordingly, there is a need in the art for an rapidly deployable mobile tower that addresses these drawbacks.

SUMMARY OF THE INVENTION

The present invention includes a mobile tower for transportation to and rapid deployment at remote sites where the mobile tower can be engaged with the ground, the mobile tower comprising an extendable and retractable tower secured to a mobile support structure; the mobile support structure including a trailer having a frame; the trailer including a plurality of rapidly deployable outriggers for ground engagement; wherein the outriggers can be compactly secured to the frame during transportation to such remote sites and rapidly deployed to stabilize the tower at such remote sites; wherein the tower includes three series of pivotally interconnected tower segments; wherein tower segments in each of the respective series of pivotally interconnected tower segments engage with tower segments in each of the other two of the three series of pivotally interconnected tower segments when the tower is at least partially assembled such that one tower segment from each of the three series of tower segments will be engaged with one tower segment of each of the other two series of pivotally interconnected tower segments to form a series of tower stories each including three tower segments; wherein when the tower is assembled, each tower story will have an axis central to and generally equidistant from each of the respective tower segments within each of the respective tower stories; the mobile tower further including a rigging apparatus and a plurality of guy wires for stabilizing the tower when the tower is assembled, wherein the rigging apparatus is secured to the tower proximate one of the respective tower stories when the tower is at least partially assembled; wherein the rigging apparatus generally encircles the tower proximate one of the respective tower stories when it is secured to the tower; and wherein each of the respective plurality of guy wires is secured to and interconnected between the rigging apparatus and one of the plurality of outriggers when the respective outrigger is deployed; wherein each of the respective outriggers have two of the plurality of guy wires secured proximate an end of each of the outriggers when the respective outriggers are deployed and the tower is at least partially assembled; wherein each of the two guy wires secured proximate the end of each of the respective outriggers is also secured to the rigging apparatus; wherein each of the two guy wires secured between the respective outriggers and the rigging apparatus are interconnected to the rigging apparatus in first and second connecting positions that are displaced from one another about an outer perimeter of the rigging apparatus. In preferred embodiments, the first and second connecting positions are generally equidistant from the axis of the tower story most proximate the rigging apparatus; wherein tower segments in each of the respective series of pivotally interconnected tower segments preferably engage with tower segments in each of the other two of the three series of pivotally interconnected tower segments when the tower is at least partially assembled such that one tower segment from each of the three series of tower segments will be engaged with one tower segment of each of the other two series of pivotally interconnected tower segments to form a series of tower stories each including three tower segments, one from each of the respective series of pivotally interconnected tower segments; and wherein the outriggers are preferably pivotally secured to the frame; and wherein each of the outriggers includes a plurality of members and at least one of the plurality of members is telescopically expandable from another one of the plurality of members so as to extend the length of the respective outrigger during deployment.

The present invention also provides an alternate tower for transportation to and rapid deployment at remote sites where the tower can be engaged with the ground, the tower comprising an extendable and retractable tower secured to a support structure; the support structure including a frame; the frame including a plurality of rapidly deployable outriggers for ground engagement; wherein the outriggers can be compactly secured to the frame and are rapidly deployable to stabilize the tower at remote sites; wherein the tower includes three series of pivotally interconnected tower segments; wherein tower segments in each of the respective series of pivotally interconnected tower segments engage with tower segments in each of the other two of the three series of pivotally interconnected tower segments when the tower is at least partially assembled such that one tower segment from each of the three series of tower segments will be engaged with one tower segment of each of the other two series of pivotally interconnected tower segments to form a series of tower stories each including three tower segments; wherein when the tower is assembled, each tower story will preferably have an axis central to and generally equidistant from each of the respective tower segments within each of the respective tower stories; the tower further including a rigging apparatus and a plurality of guy wires for stabilizing the tower when the tower is assembled, wherein the rigging apparatus is secured to the tower proximate one of the respective tower stories when the tower is at least partially assembled; wherein the rigging apparatus generally encircles the tower proximate one of the respective tower stories when it is secured to the tower; and wherein each of the respective plurality of guy wires is secured to and interconnected between the rigging apparatus and one of the plurality of outriggers when the respective outrigger is deployed; wherein each of the respective outriggers have two of the plurality of guy wires secured proximate an end of each of the outriggers when the respective outriggers are deployed and the tower is at least partially assembled; wherein each of the two guy wires secured proximate the end of each of the respective outriggers is also secured to the rigging apparatus; wherein each of the two guy wires secured between the respective outriggers and the rigging apparatus are interconnected to the rigging apparatus in first and second connecting positions that are displaced from one another about an outer perimeter of the rigging apparatus. In preferred embodiments, the first and second connecting positions are generally equidistant from the axis of the tower story most proximate the rigging apparatus; wherein tower segments in each of the respective series of pivotally interconnected tower segments preferably engage with tower segments in each of the other two of the three series of pivotally interconnected tower segments when the tower is at least partially assembled such that one tower segment from each of the three series of tower segments will be engaged with one tower segment of each of the other two series of pivotally interconnected tower segments to form a series of tower stories each including three tower segments, one from each of the respective series of pivotally interconnected tower segments; and wherein the outriggers are preferably pivotally secured to the frame; and wherein each of the outriggers includes a plurality of members and at least one of the plurality of members is telescopically expandable from another one of the plurality of members so as to extend the length of the respective outrigger during deployment. Methods of deploying such an alternate tower are also provided.

The present invention also includes a method of deploying a mobile tower that includes transporting the mobile tower to a location, preferable a remote site; erecting the tower at a remote site on ground located at the site, wherein the method further includes the steps of providing a remotely deployable mobile tower including three section chains, each section chain including a series of pivotally interconnected chain segments or sections rolled into a bale, each chain section having hooks that engage hooks on corresponding chain sections of other of the three section chains to interlock the corresponding chain sections when the bales are unrolled, so that the interlocked chain sections assemble to form a stable structure which extends to form a tower as the bales are unrolled, the three bales being attached to a mobile trailer; providing a mobile support system including the trailer, the trailer having a frame, and the mobile support system including a plurality of rapidly deployable outriggers that can be compactly secured to the frame during transportation at such remote sites, each outrigger including a plurality of outrigger members at least one of which is pivotally interconnected with another one of the outrigger members and at least one of the outrigger members is slideably interconnected with another one of the outrigger members to form a telescopically expandable structure, so that each outrigger is transformable between a compact transportation configuration and a less-compact deployed configuration; configuring the mobile tower and the mobile support system in a transportation configuration in which the mobile tower and mobile support system are secured together on the trailer in a compact configuration which allows transport to the remote site; transforming the outriggers from the compact transportation configuration to a deployed configuration in which each outrigger engages the ground surface, with the point of engagement of the respective outriggers being arranged to provide stable support for the tower when erected; and unrolling the bales so that the chain sections interlock to form tower while the support system aids in stabilizing the structure; wherein the step of unrolling the bales so that the chain sections interlock to form tower includes the step of pausing the unrolling as the tower is partially assembled so that the tower extends an initial distance, and further comprising the steps of providing an attachable guy-wire mounting structure; providing a plurality of guy wires, each of which having a first end and a second end; attaching the attachable guy-wire mounting structure to the partially assembled tower and attaching the first end of each of the plurality of guy wires to the attachable guy-wire mounting structure; attaching the second end of each of the plurality of guy wires to one of the plurality of outriggers; further unrolling the bales to extend the tower; and adjusting the length and tension of the guy wires to provide support for the erected tower.

In preferred embodiments, the method further comprises the steps of providing a tension measurement device; providing a vertical alignment measurement device; and using the vertical alignment measurement device and the tension measurement device to aid in the step of adjusting the length and tension of the guy wires to facilitate alignment for vertical orientation of the erected tower and tension for support against anticipated loads; and preferably further comprising the steps of partially rolling up the bales to partially disassemble the tower; detaching the first end of the guy wires from the attachable guy-wire mounting structure; detaching the attachable guy-wire mounting structure from the tower; further rolling up the bales to disassemble the tower; detaching the second end of the guy wires from the outriggers; and transforming the outriggers from the deployed configuration to the compact transportation configuration.

In preferred embodiments the method further comprises the steps of providing a plurality of brace wires, each brace wire having a first end and a second end, each of the respective first end being secured to each of a plurality of winches, each of the respective winches being secured to the frame; wherein the step of transforming the outriggers from the compact transportation configuration to a deployed configuration includes the steps of attaching the second end of each of the plurality of brace wires to one of the plurality of outriggers; and using each of the plurality of winches to adjust the length and tension of the respective brace wire to raise or lower the respective outrigger to contact the ground surface to support the trailer and the mobile tower; wherein the plurality of outriggers of the provided mobile support system each preferably includes a plurality of longitudinal members and a plurality of joints and a plurality of securing mechanisms and a support strut and a foot having a foot pad, and further comprising the step of moving each of the plurality of joints to configure the longitudinal members and the support strut in a deployed configuration generally extending from the trailer and configuring the respective foot so that the respective foot pad contacts the ground surface, and using each of the plurality of securing mechanisms to secure each of the respective joints in the deployed configuration.

In alternate embodiments, a further method includes the steps of providing a remotely deployable tower including three section chains, each section chain including a series of pivotally interconnected chain segments or sections rolled into a bale, each chain section having hooks that engage hooks on corresponding chain sections or segments of other of the three section or segment chains to interlock the corresponding chain sections when the bales are unrolled, so that the interlocked chain sections assemble to form a stable structure which extends to form a tower as the bales are unrolled, the three bales being attached to a frame; providing a support system including a frame, and the frame including a plurality of rapidly deployable outriggers that are preferable compactly secured to the frame during delivery at such remote sites, each outrigger including a plurality of outrigger members at least one of which is pivotally interconnected with another one of the outrigger members and at least one of outrigger member is preferably slideably interconnected with another one of the outrigger members to form a telescopically expandable structure, so that each outrigger is transformable between a compact transportation configuration and a less-compact deployed configuration; configuring the tower and the frame in a transportation configuration in which the tower and frame are secured together in a compact configuration which allows transport to the remote site; transforming the outriggers from the compact transportation configuration to a deployed configuration in which each outrigger engages the ground surface, with the point of engagement of the respective outriggers being arranged to provide stable support for the tower when erected; and unrolling the bales together so that the chain sections interlock to form the tower while the frame aids in stabilizing the structure; wherein the step of unrolling the bales so that the chain sections interlock to form tower includes the step of pausing the unrolling as the tower is partially assembled so that the tower extends an initial distance, and further comprising the steps of providing an attachable guy wire mounting structure or rigging apparatus; providing a plurality of guy wires, each of which having a first end and a second end; attaching the attachable guy-wire mounting structure to the partially assembled tower and attaching the first end of each of the plurality of guy wires to the attachable guy wire mounting structure or rigging apparatus; attaching each of the second ends of each of the plurality of guy wires to one of the plurality of outriggers; further unrolling the bales to extend the tower; and adjusting the length and tension of the guy wires to provide support for the erected tower.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numbers and letters designate like parts throughout the figures thereof, wherein:

FIG. 9B is a partial sectional view of a portion of the pivot joint of FIG. 9A, as seen from the line 9B-9B, which passes through an axis 70a of the shaft or pin 72a;

FIG. 24B is an enlarged detailed portion of the rigging system 84, shown in the dashed oval 24B shown in FIG. 23A, illustrating come-alongs 89a and 89b secured to the second ends 92 of two guy wires 88, which are attached to respective come-along attachment features 90a and 90b of an outrigger 40a;

FIG. 28 is a perspective view of an alternate mobile tower 110, similar to that shown in FIGS. 1-5, but including a tower 114 that is secured to a frame 136 that has no wheels, as opposed to the trailer 35 shown in FIGS. 1-5 that has wheels 34 for transporting the trailer 36; wherein FIG. 28 illustrates parts of an outrigger 140a of the frame 136 partially deployed in the same manner that corresponding parts are illustrated in FIG. 2, in which the outrigger 40a is shown partially deployed and shown in phantom in an alternate intermediate position.

DETAILED DESCRIPTION

Figure 1:
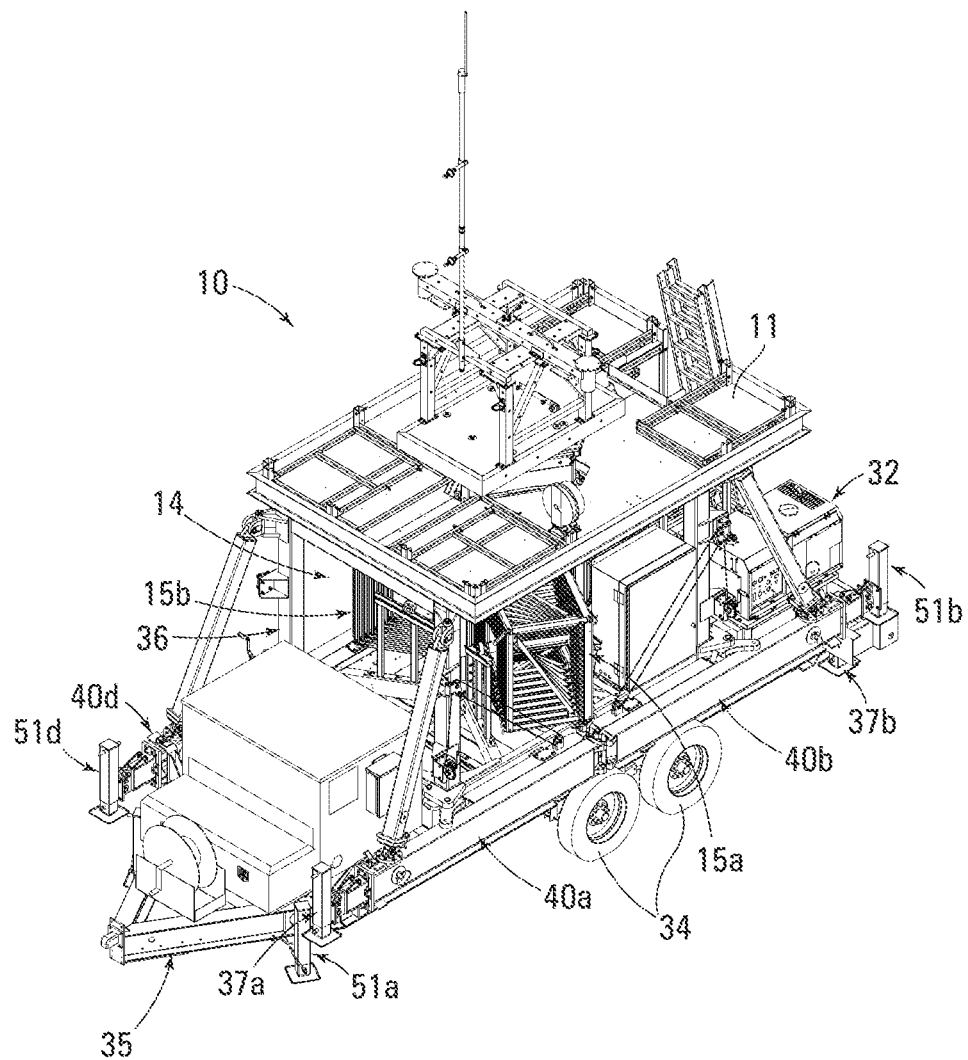
FIG. 1 is a perspective view of a mobile tower having a support system prior to deployment.

Referring now to the drawings, and to FIGS. 1-5 in particular, a mobile tower having support system or mobile tower with support system or mobile tower 10 is shown. The mobile tower 10 can be configured and arranged for transport to a location and for rapid deployment at the location, as shown in FIG. 1. Referring now particularly to FIG. 1, the mobile tower with support system 10 includes a trailer 35 having a frame 36 and a plurality of outriggers 40 that are preferably compactly secured to the frame 36 for transport as illustrated in FIG. 1. The mobile tower with support system 10 includes an extendable and retractable tower 14 and a trailer 35. The trailer 35 preferably includes a frame 36 and a plurality of outriggers 40 (individually referred to as items 40a, 40b, 40c, 40d), which are compactly secured on the trailer 35 having wheels 34, so that the mobile tower with support system 10 can be conveniently transported such as by towing the trailer 35 along roadways to a location where a tower is required. There are many situations in which such a mobile tower can be advantageously utilized to support a payload 6 a distance above the ground, such as to support a communication antenna, lighting, camera or other monitoring equipment, surveying or reconnaissance equipment, or for supporting personnel, for example. The present invention is particularly advantageous for situations in which rapid deployment of a tower offers benefit, such as for rapid response at a location affected by a weather event or other disruptive situation or equipment failure, or when rapid deployment offers a strategic advantage in a law enforcement or military action, for example.

Preferably, the trailer 35 includes a plurality of outriggers 40, which, when deployed, offer stability and support in addition to what can be achieved by a tower or a trailer without such stabilizing outriggers. Preferably, the support system trailer 35 includes a frame 36, which provides integrity to the support system trailer 35 and securement of the outriggers 40 and the tower 14. FIG. 1 illustrates the mobile tower having support system 10 mounted to a mobile trailer 35 which can be transported to a desired location for deployment of the tower 14. The support system trailer 35 preferably includes four outriggers 40, each attached to the frame 36, and the outriggers 40 can be compactly secured to the frame 36 for transport as illustrated. Outrigger securing mechanisms 41 secure each of the outriggers 40 compactly and securely to the frame 36 for transport; each of the outrigger securing mechanisms 41 preferably includes a releasable latch 42 which releasably engages the outrigger 40. Preferably, when the outriggers 40 are compactly secured to the frame 36 for transport, the mobile tower having support system 10 can be transported along roadways, meeting dimensional requirements for passage along such roadways. For example, when compactly secured for transport, the mobile tower having support system 10 has a width which is preferably no greater than about 102 inches to comply with roadway requirements in the U.S.

Figure 2:
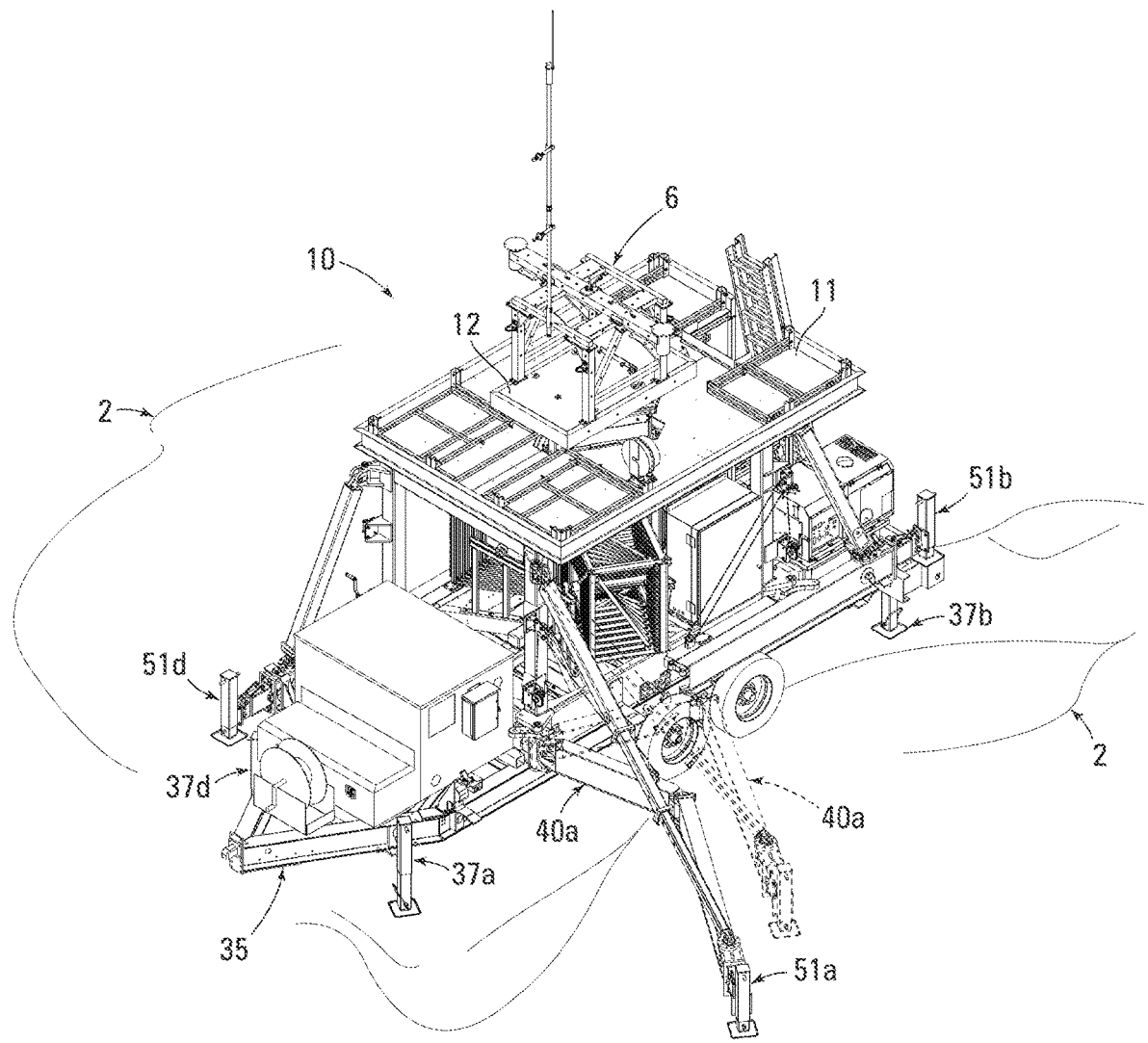
FIG. 2 is a perspective view of the mobile tower 10 shown in FIG. 1, but illustrating parts of an outrigger of the support system partly deployed, and in an intermediate position shown in phantom.
Figure 3:
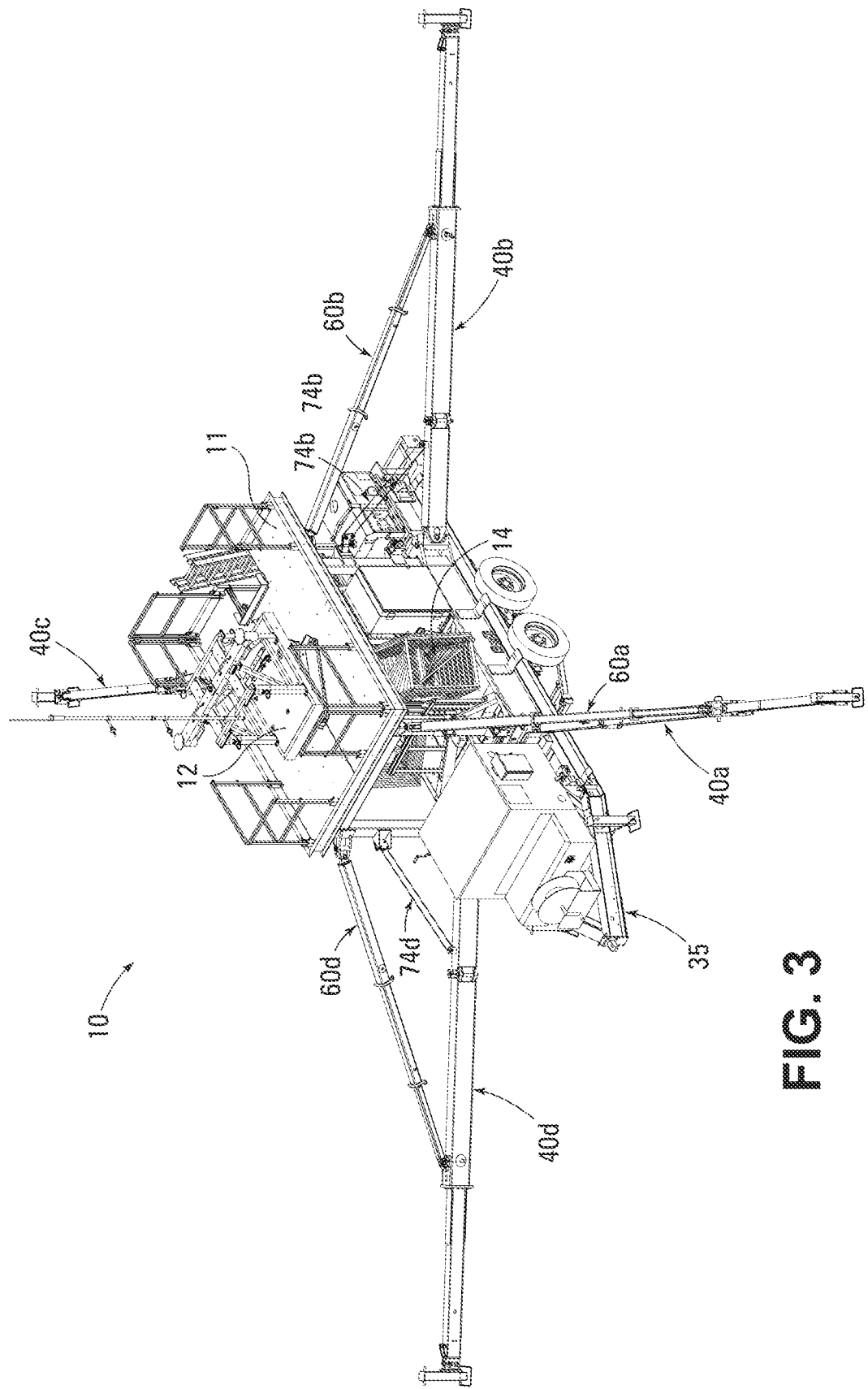
FIG. 3 is a perspective view of the mobile tower 10 shown in FIG. 1, but illustrated with the outriggers fully extended.
Figure 4:
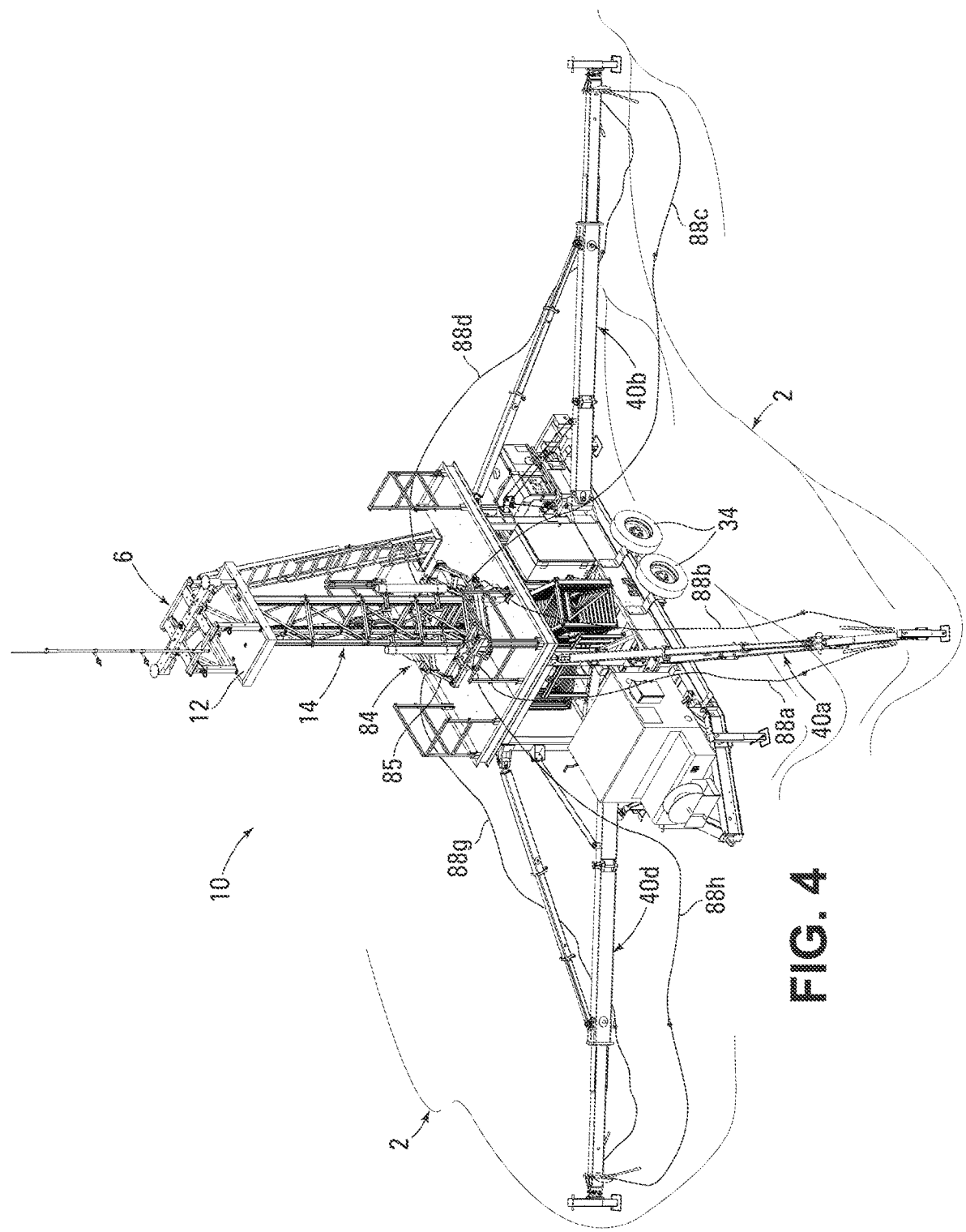
FIG. 4 is a perspective view of the mobile tower shown in FIG. 1, but showing the tower partially extended and a rigging apparatus and guy wires attached.

When the mobile tower having support system 10 is located at a location where the tower 14 is to be utilized, the mobile tower having support system 10 is deployed to provide support and stability for the extended mobile tower 14. FIGS. 2-4 illustrate intermediate positions of the mobile tower with support system 10 to show how the mobile tower with support system 10 is deployed. An outrigger 40 is released from securement to the frame 36 and is moved as illustrated in FIG. 2, which shows the outrigger 40a pivoting and extending outwardly from the frame 36. To further support each outrigger 40, the trailer 35 preferably includes a strut system 60 and a brace system 74; the outrigger 40, the trailer 35, and the brace system 74 are described in detail elsewhere herein, including in connection with FIGS. 6-18B below.

FIG. 2 further illustrates in phantom an intermediate position in which the outrigger 40a is extended less, to show how the outrigger 40 can articulate and extend from the frame 36. The outriggers 40b, 40c, 40d are extended in a similar manner; each of the four outriggers 40 is further extended as illustrated in FIG. 3. All four of the outriggers 40 are fully extended, and the tower 14 is partially extended as illustrated in FIG. 4. Preferably, after all of the outriggers 40 are fully extended and engaged with the ground 2 as illustrated in FIG. 4, the tower 14 is partially extended and a rigging system 84 is attached to the tower 14, and guy wires or guywires 88 are attached as also illustrated in FIG. 4, and as further described elsewhere herein. Preferably, the mobile tower with support system 10 includes a work platform 11 for ease of access to payload mounting and service; the work platform 11 may include guard rails, which may fold to a compact arrangement for transport.

Figure 5:
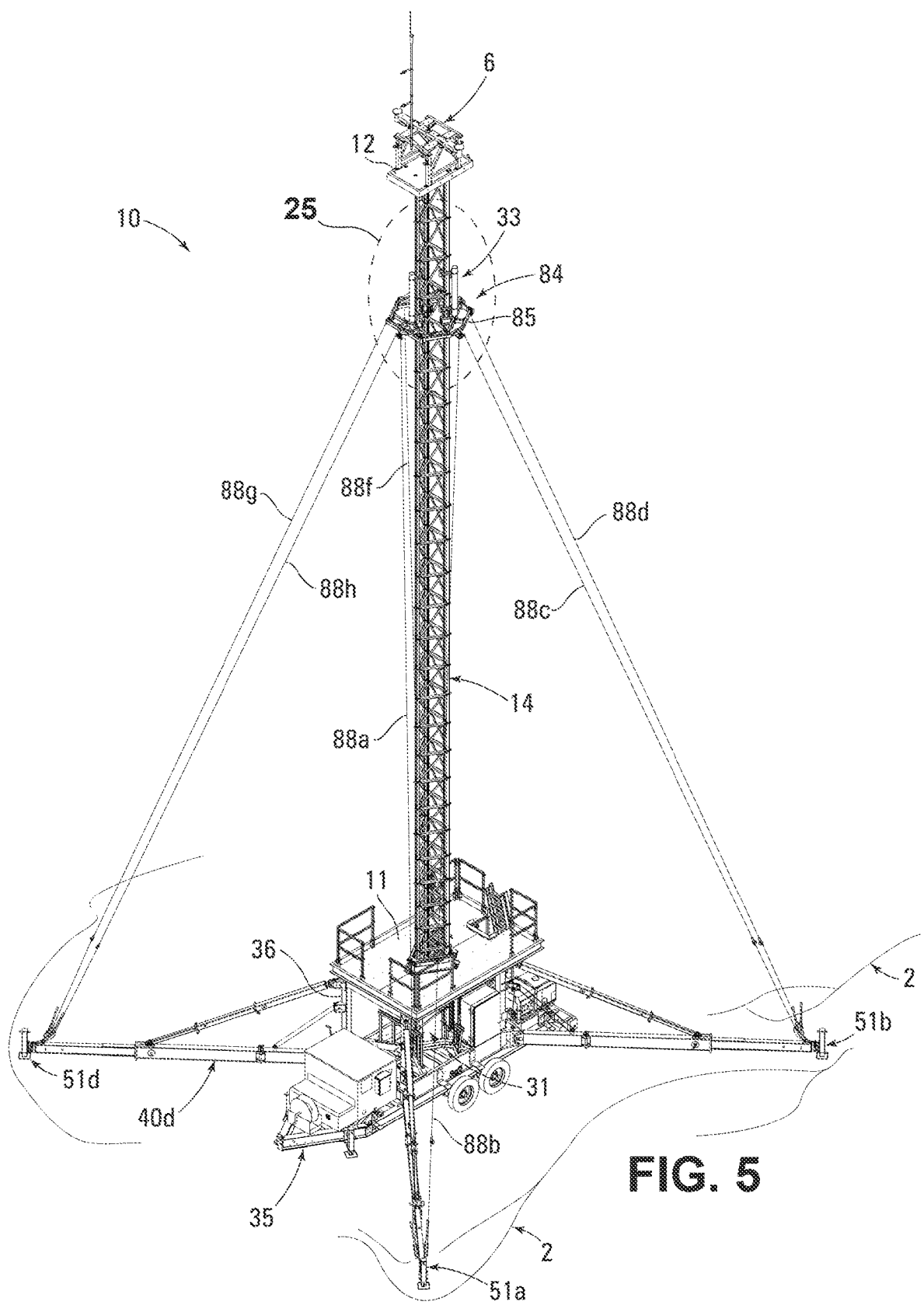
FIG. 5 is a perspective view of the mobile tower shown in FIG. 1, but showing the tower fully extended and the outriggers fully deployed.

Preferably, after the guy wires 88 are attached, the tower 14 is extended and the tension in each of the guy wires 88 is adjusted as will be described in detail herein; FIG. 5 illustrates the mobile tower with support system 10 deployed with the tower 14 extended.

Now describing the mobile tower with support system 10 in greater detail with regard to FIGS. 6-18B, we note that some elements of the mobile tower with support system 10 are not shown on FIGS. 6-18B for clarity, in order to better illustrate aspects of the trailer 35; in particular, the tower 14 is not shown in these views since it would further obscure some portions of the trailer 35.

Figure 6:
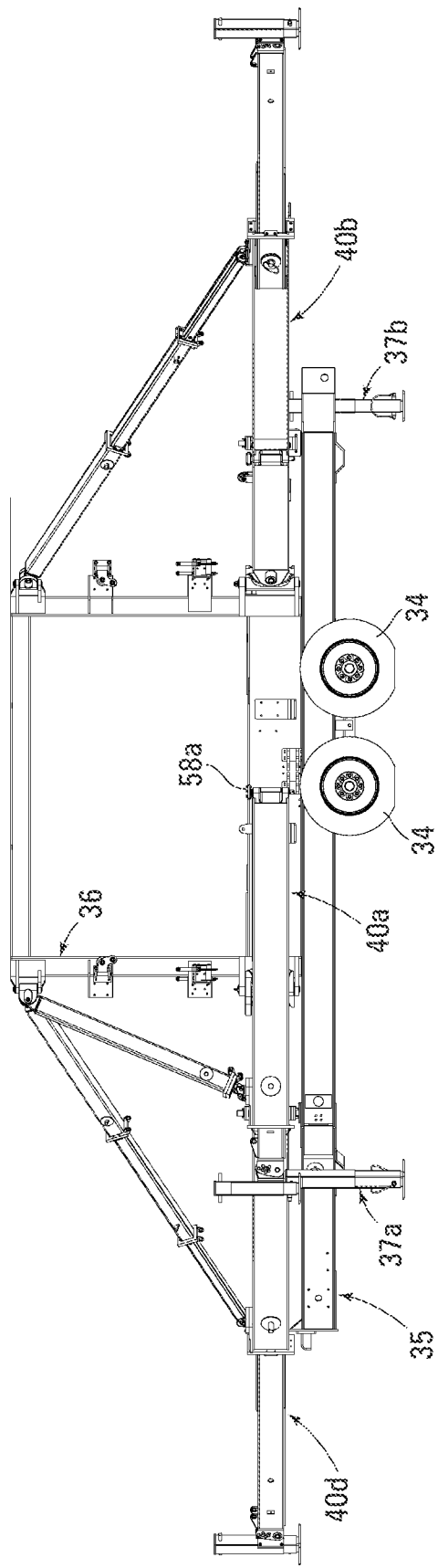
FIG. 6 is a side view of the mobile trailer shown in FIG. 1, which is a portion of the trailer, wherein the trailer is showing one of the outriggers compactly secured to the frame and other outriggers extended.
Figure 7:
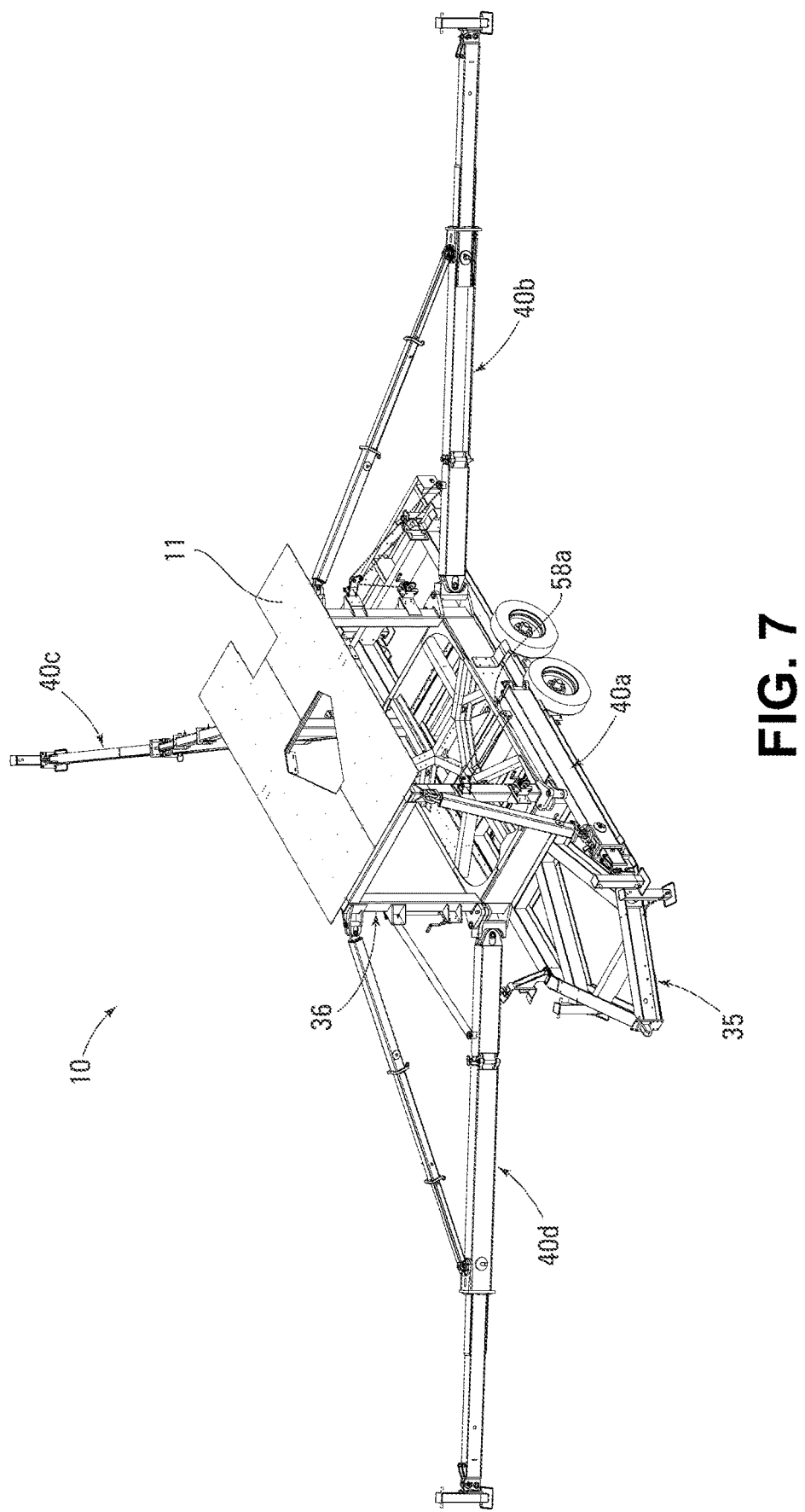
FIG. 7 is a perspective view of the portion of the trailer 35 shown in FIG. 6, with one outrigger compactly secured to the frame and the other outriggers extended as in FIG. 6.
Figure 8:
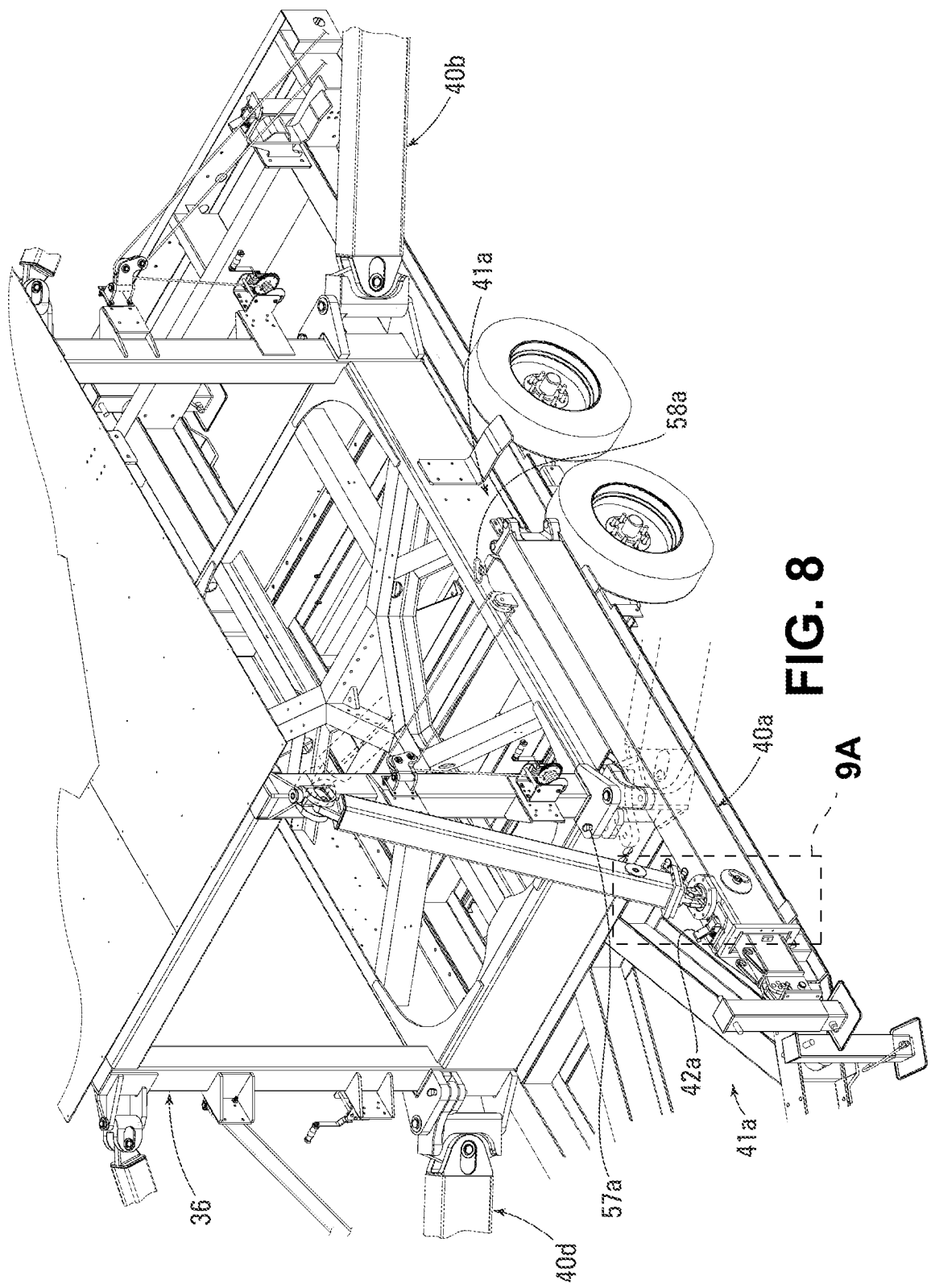
FIG. 8 is an enlarged portion of the view of the trailer 35 of FIG. 7, with an alternate location of a portion of one of the outriggers shown in phantom.

As illustrated in FIGS. 6-8, the frame 36 is preferably affixed to a trailer 35, outrigger 40a is compactly secured to the frame, and the outriggers 40b, 40c, and 40d are extended. Strut systems 60a, 60b, 60c, and 60d are rotatably attached to the frame 36 and also to the respective outrigger 40a, 40b, 40c, 40d. Brace systems 74a, 74b, 74c, and 74d are also attached to the frame 36 and also to the respective outrigger 40a, 40b, 40c, 40d. The progression of extending and deploying the outriggers 40 is illustrated in FIGS. 6-18B. In particular, extension and deployment of outrigger 40a is shown in greater detail than that of the outriggers 40b, 40c, and 40d. Outriggers 40b, 40c, and 40d preferably extend and deploy in a similar manner to that illustrated for outrigger 40a, although some elements and the general configuration and movements of outriggers 40b and 40c preferably are plane-reflected or "mirror-image" of those of outriggers 40a and 40d, as can be seen on the figures. The sequence in collapsing the outriggers 40 and compactly securing them to the frame 36 preferably is generally the reverse of the sequence of extending and deploying the outriggers 40.

Figure 9A:
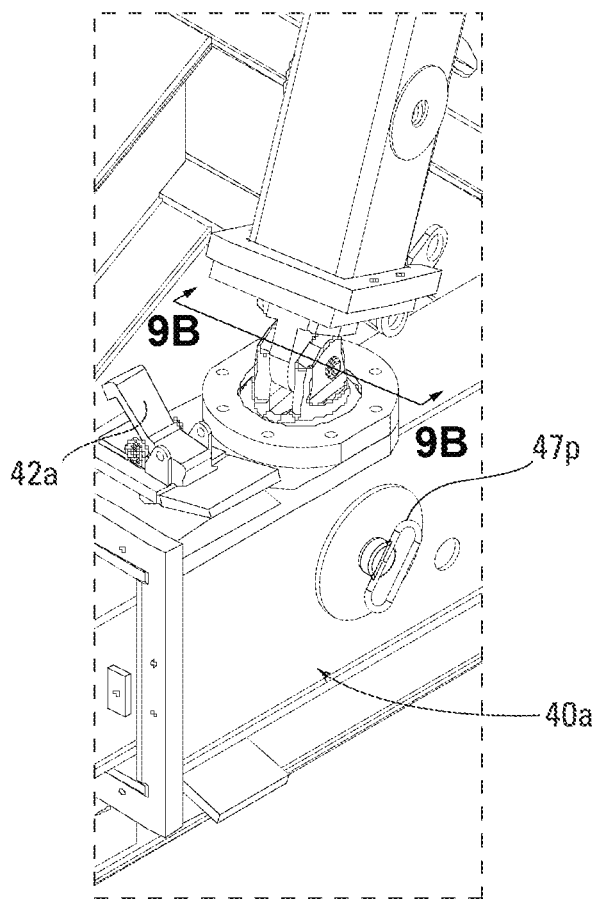
FIG. 9A shows a portion of one of the outriggers shown in the dashed outlined box 9A of FIG. 8, showing a double pivot joint, as indicated in FIG. 8.
Figure 9B:
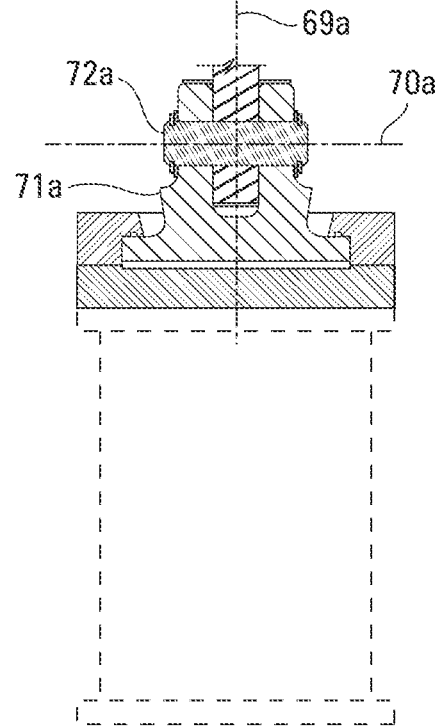

When it is desired to transport the mobile tower with support system 10, the outriggers 40 are preferably compactly secured to the frame 36, as is the outrigger 40a as illustrated in FIGS. 6-8. Outrigger securing mechanisms 41 engage each respective outrigger 40 to secure each respective outrigger 40 compactly and securely to the frame 36 for transport. Each of the outrigger securing mechanisms 41 can include various latching and securing mechanisms such as pins, clips, cables, hooks, latches, locks, keys, and so forth; each outrigger securing mechanism preferably includes a releasable latch 42 which releasably engages the outrigger 40 to releasably secure the outrigger 40 for transport. Each outrigger securing mechanism 41 also preferably includes a stow pin 58 which engages the outrigger 40 proximate to the outrigger second pivoting joint 45 to secure the outrigger 40 to the frame 36. Preferably, when the outriggers 40 are compactly secured to the frame 36 for transport, the mobile tower with support system 10 can be transported along roadways, meeting dimensional requirements for passage along such roadways. When the mobile tower with support system 10 is located at a location where the tower 14 is to be utilized, leveling jacks 37 are adjusted to engage the ground 2 to support the trailer 35, and the mobile tower with support system 10 is deployed to provide support and stability for the mobile tower 14. When it is desired to extend and deploy the outriggers 40, the respective outrigger securing mechanism 41 is disengaged. With the outrigger securing mechanism 41 disengaged, the respective outrigger 40 can be extended and deployed. As illustrated in partial phantom view in FIG. 8, the outrigger 40a, with the outrigger securing mechanism 41a having been released, can rotate away from its compact secured position against the frame 36. Referring to the illustration of outrigger 40a in FIG. 8, the outrigger 40a is preferably attached to the frame 36 by an outrigger first pivoting joint 43a, and includes an outrigger second pivoting joint 45a to allow an outrigger first portion 44a and an outrigger second portion 46a to pivot relative to each other. Referring also to FIGS. 9A-11, the supporting strut system 60a is preferably also attached to the frame 36 and to the outrigger 40a by a strut first pivoting joint 61a which pivots about a fourth axis 68a. The strut system 60a preferably includes a strut first portion 62a which telescopes at a strut first telescoping joint 63a relative to a strut second portion 64a so that the strut system 60a extends as the outrigger 40a is extended from the frame 36. The strut system 60a also preferably includes a strut third portion 66a which telescopes at a strut second telescoping joint 65a relative to the strut second portion 64a so that the strut system 60a extends as the outrigger 40a is extended from the frame 36. The strut third portion 66a is preferably attached to the outrigger second portion 46a by a strut second pivoting joint 67a. The strut second pivoting joint 67a is preferably a double pivoting joint, providing rotation of the strut third portion 66a relative to the outrigger second portion 46a about two axes (fifth axis 69a and sixth axis 70a). In the strut second pivoting joint 67a, as illustrated in FIGS. 9A and 9B, rotating flange 71a provides for rotation about the fifth axis 69a, and shaft 72a provides for rotation about the sixth axis 70a.

Figure 10:
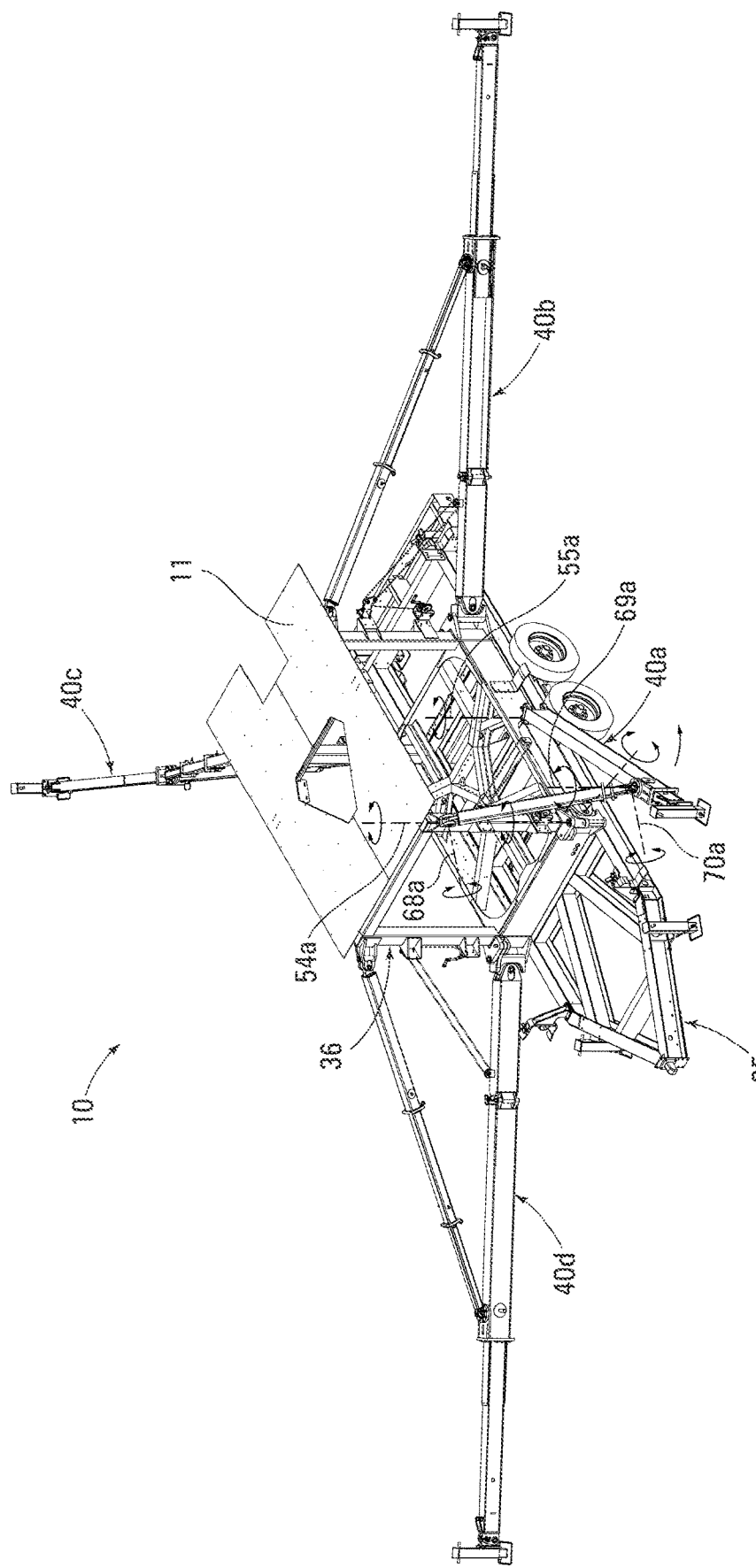
FIG. 10 is a perspective view of the portion of the trailer 35 of FIG. 7, showing one of the outriggers 40a in an intermediate position, with a portion of the outrigger rotated to partially extend the outrigger, and illustrating pivoting joints.
Figure 11:
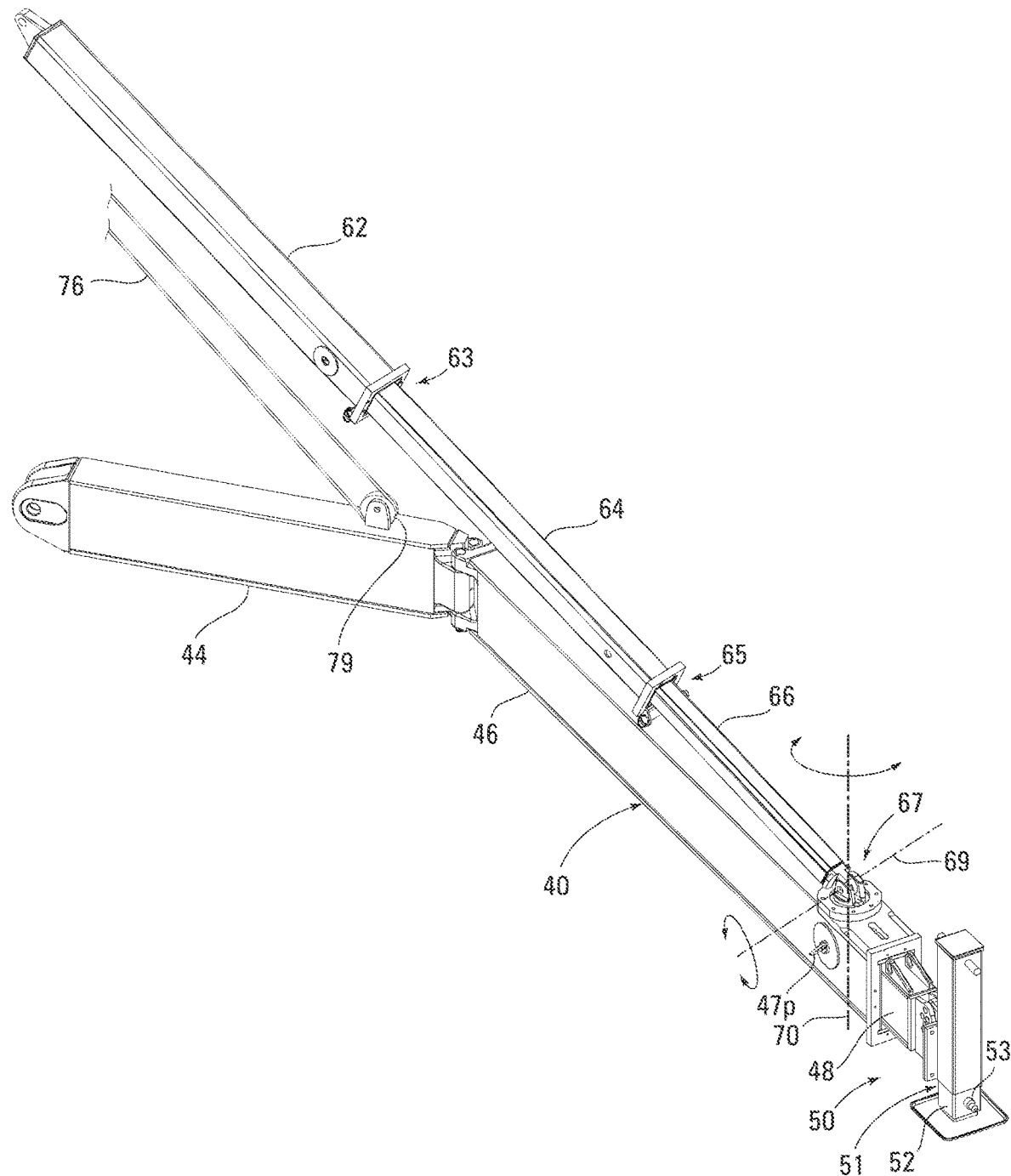
FIG. 11 is an enlarged perspective view of a portion of an outrigger, further illustrating the double pivot joint illustrated in FIG. 9A and indicating the possible rotations of the double pivot joint.

The outrigger 40a and the strut system 60a are further extended and deployed as illustrated in FIG. 10. The outrigger first pivoting joint 43a, provides for rotation about a first axis 54a, so that the outrigger 40a can extend from the frame 36 and deploy. The outrigger second pivoting joint provides for rotation about a second axis 55a, so that the outrigger second portion 46a can rotate with respect to the outrigger first portion 44a to further extend and deploy the outrigger 40a. The strut first pivoting joint 61a provides for rotation, so that the strut system 60a can rotate with respect to the frame 36, preferably about the same axis as the outrigger first pivoting joint 43a, namely, the first axis 54a. The strut first pivoting joint 61a is preferably a double pivoting joint, and additionally provides for rotation about a fourth axis 68a.

Figure 12:
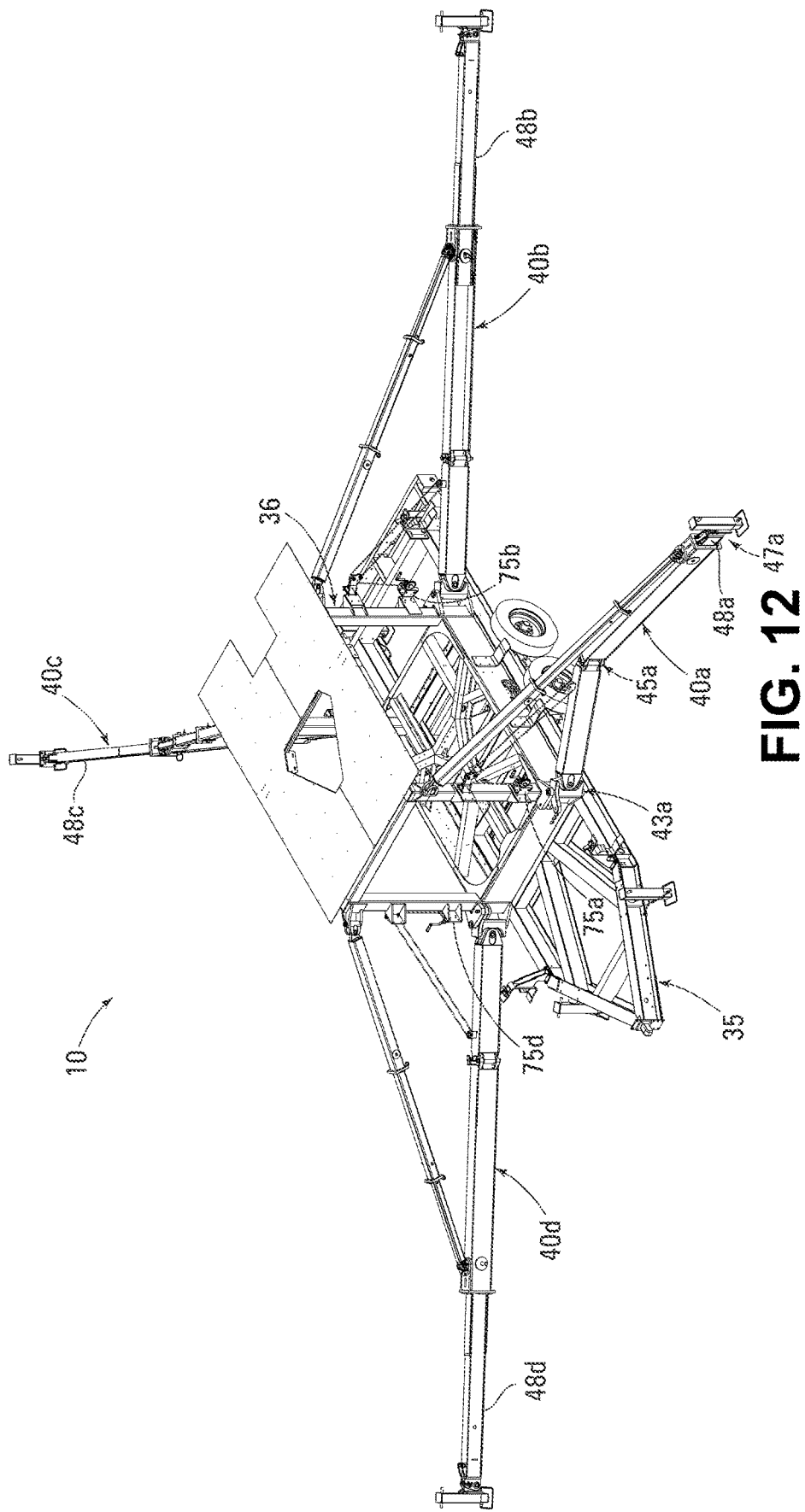
FIG. 12 is a perspective view of the portion of the trailer 35 of FIG. 7 similar to that of FIG. 10, but with the partially extended outrigger 40a in another intermediate position, with portions of the outrigger rotated further and the outrigger extended further.
Figure 13:
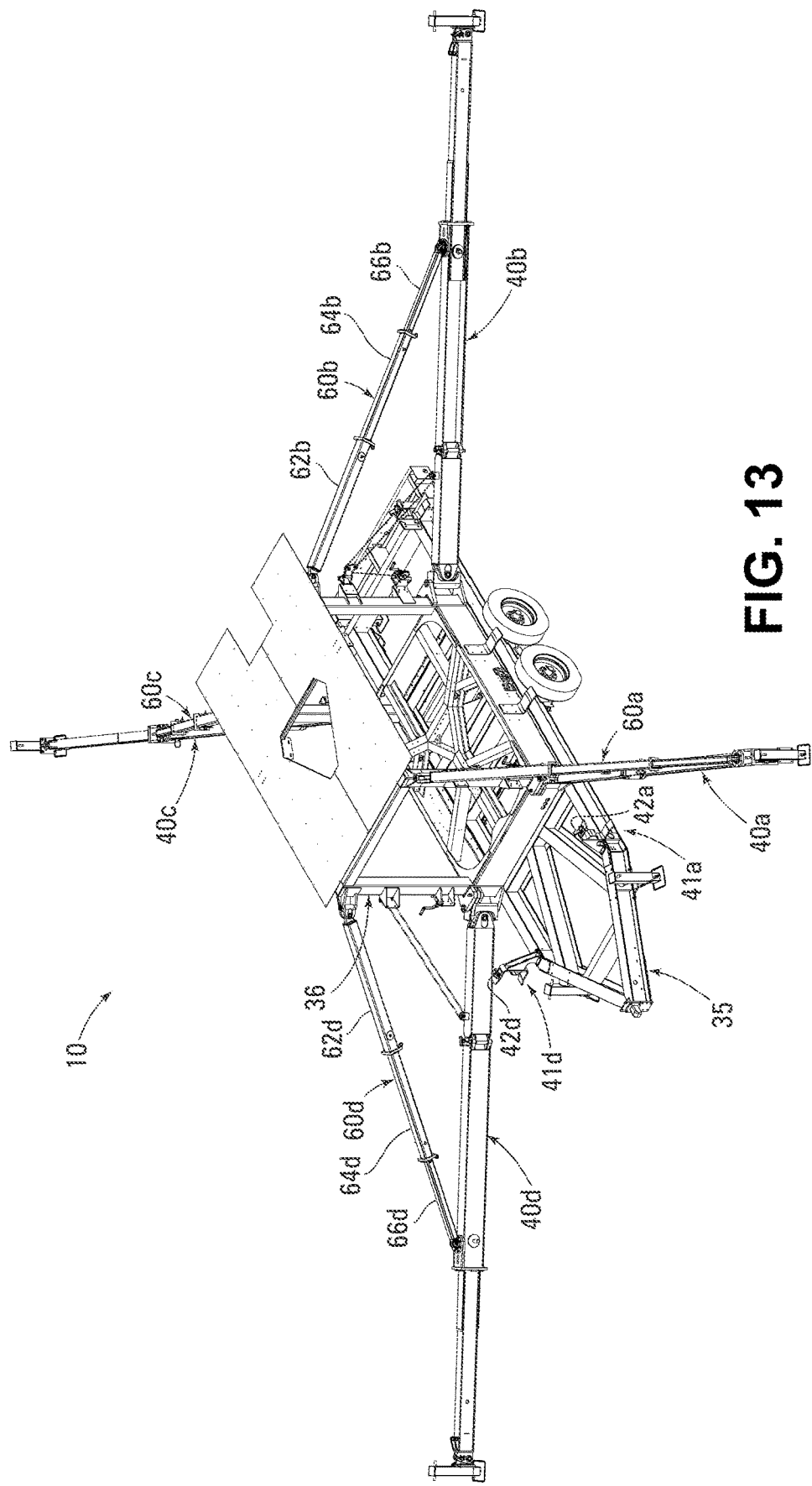
FIG. 13 is a perspective view of the portion of the trailer 35 of FIG. 7 similar to that of FIG. 12, but with the partially extended outrigger 40a in a further intermediate position, but with the outrigger fully rotated.

The outrigger 40a and the strut system 60a are further extended and deployed as illustrated in FIG. 12, and still further extended and deployed as illustrated in FIG. 13. When the outrigger first portion 44a has been rotated with respect to the frame 36 as illustrated in FIG. 13, locking pin 57a is engaged at the outrigger first pivoting joint 43a to prevent rotation of the outrigger first pivoting joint 43a to secure outrigger 40a at a desired angle with respect to the frame 36. The outrigger 40a is secured at an angle 59 with respect to the frame 36; preferably, the angle 59 is about 45 degrees. As the outrigger 40a and the strut system 60a are extended and deployed as generally illustrated in FIGS. 7-13, the strut system 60a provides support and stability for the outrigger 40a.

Figure 14:
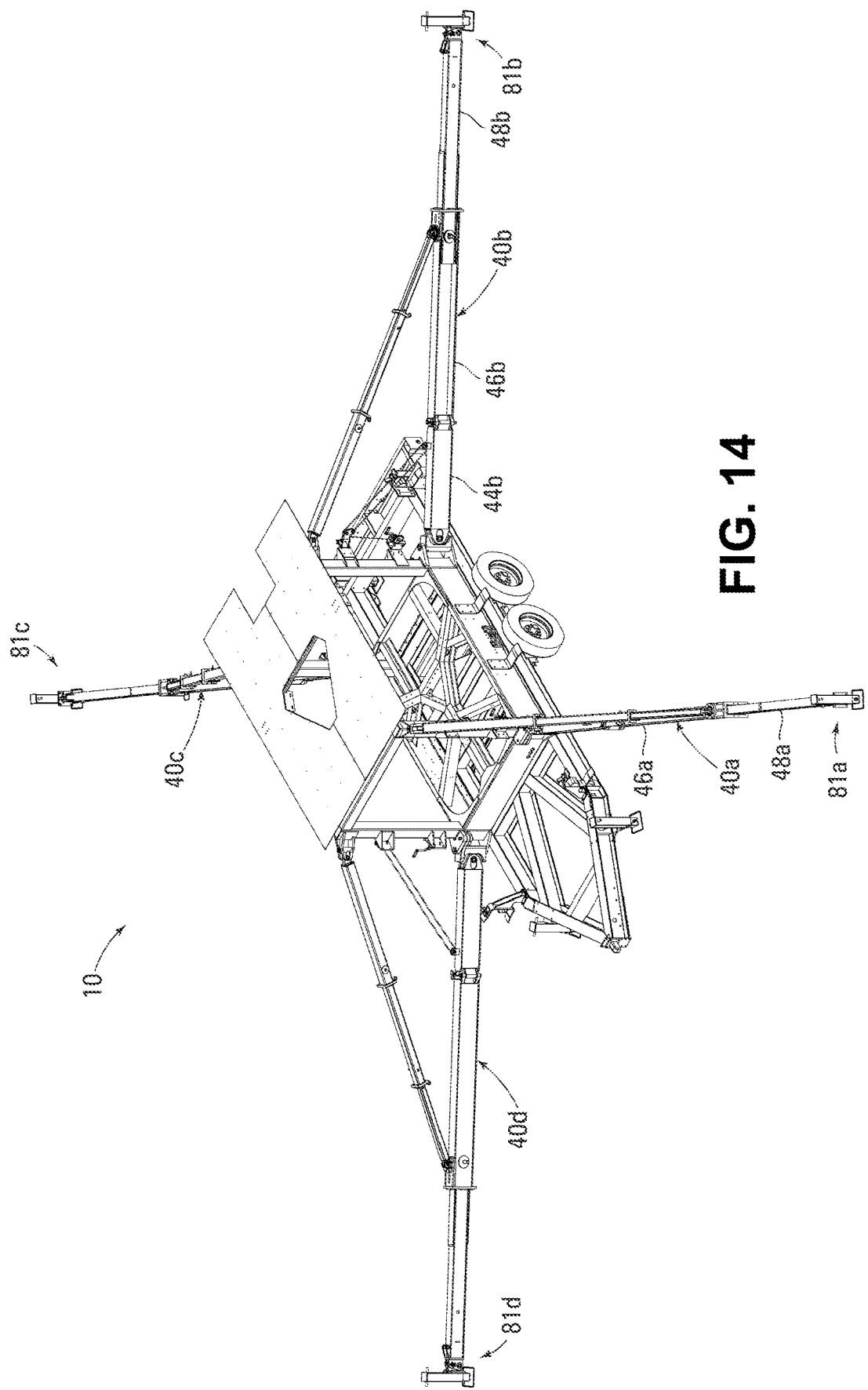
FIG. 14 is a perspective view of the portion of the trailer 35 of FIG. 7 similar to that of FIG. 13, but with all four outriggers fully extended.
Figure 15:
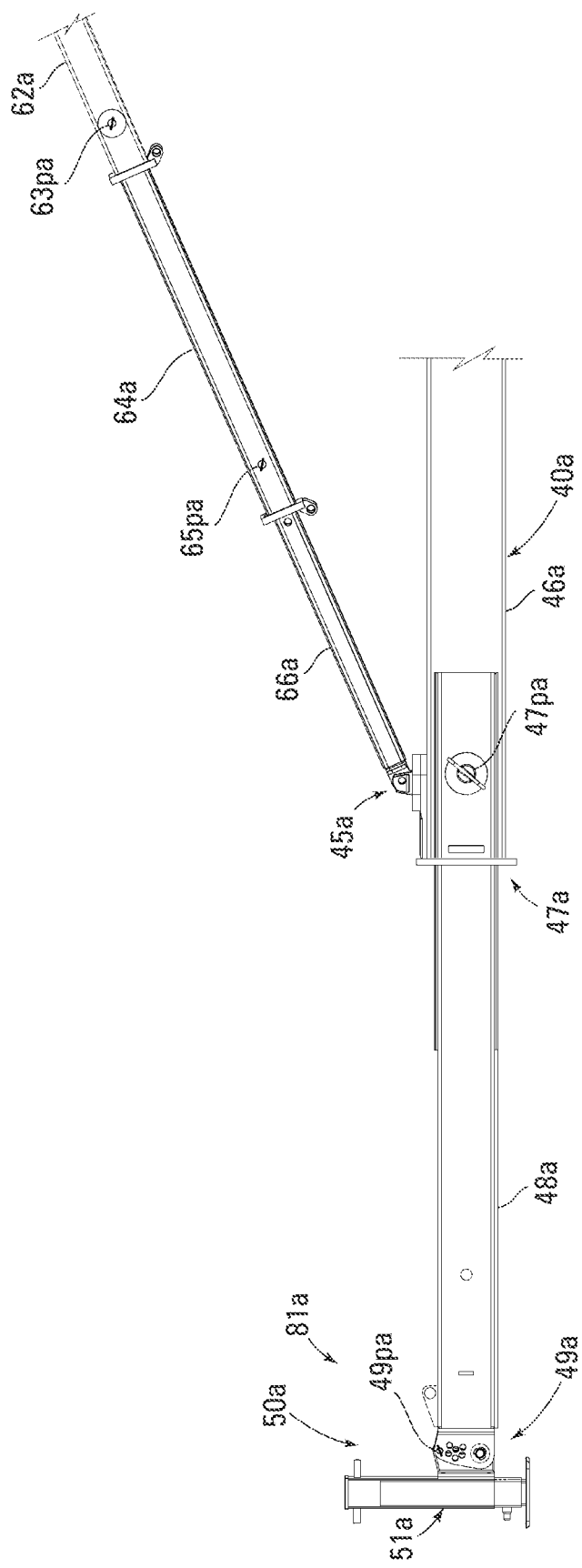
FIG. 15 is a side view of a portion of an extended outrigger 40a, showing telescoping elements.
Figure 16:
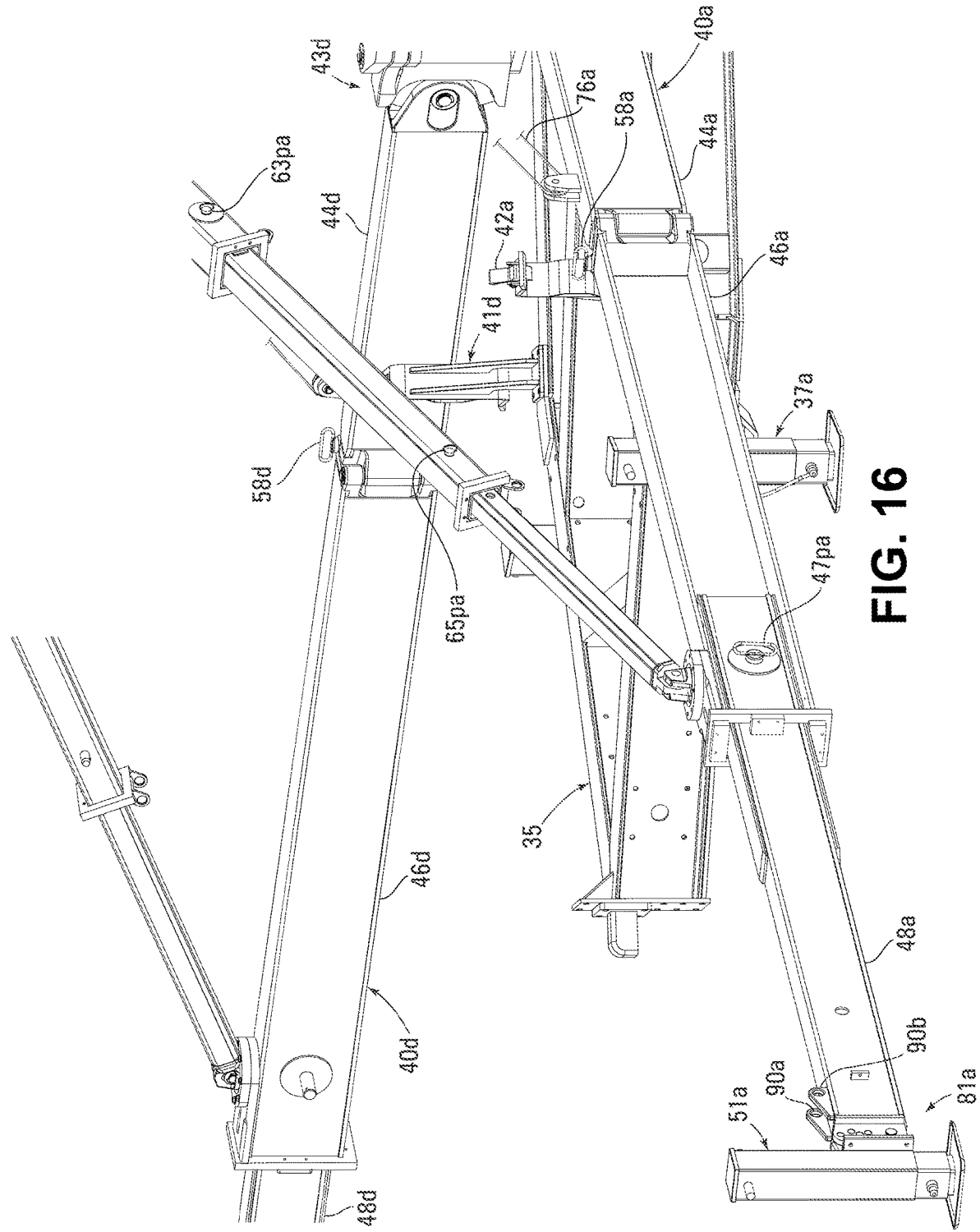
FIG. 16 is an enlarged perspective view of a portion of the trailer 35 of FIG. 7 with outriggers extended as in FIG. 14, illustrating portions of two outriggers 40a and 40d.

The outrigger 40a preferably includes an outrigger third portion 48a which telescopes with respect to the outrigger second portion 46a at outrigger telescoping joint 47a, to further extend the outrigger 40a as illustrated particularly in FIGS. 14-16. Each outrigger securing mechanism 41 also preferably includes a stow pin 58 which engages the outrigger 40 proximate the outrigger second pivoting joint 45 to secure the outrigger 40 to the frame 36 for transport, and the stow pin is disengaged for deployment of the outrigger 40. Preferably, when the outrigger first portion 44a is aligned with the outrigger second portion 46a by rotation of the outrigger second pivoting joint 45, the stow pin 58a is engaged with the outrigger first portion 44a and the outrigger second portion 46a to prevent rotation of the outrigger second pivoting joint 45a. Each outrigger 40 also preferably includes an outrigger telescoping pin 47p which engages the outrigger 40 proximate the outrigger telescoping joint 47 to secure the outrigger third portion 48 compactly retracted with respect to the outrigger second portion 46 for transport, and the outrigger telescoping pin 47p is disengaged when it is desired to extend the outrigger third portion 48 from the outrigger second portion 46 for deployment of the outrigger 40. Preferably, when the outrigger third portion 48a is extended for deployment, the outrigger telescoping pin 47pa is engaged with the outrigger third portion 48a and the outrigger second portion 46a to prevent telescopic movement of the outrigger telescoping joint 47a.

Each strut system 60 preferably includes a strut first telescoping pin 63p which engages the strut system 60 proximate the strut first telescoping joint 63 to secure the strut second portion 64 compactly retracted with respect to the strut first portion 62, and the strut first telescoping pin 63p is disengaged when it is desired to extend the strut second portion 64 from the strut first portion 62 for deployment of the strut system 60. Each strut system 60 also preferably includes a strut second telescoping pin 65p which engages the strut system 60 proximate the strut second telescoping joint 65 to secure the strut third portion 66 compactly retracted with respect to the strut second portion 64, and the strut second telescoping pin 65p is disengaged when it is desired to extend the strut third portion 66 from the strut second portion 64 for deployment of the strut system 60. Preferably, when the strut system 60 is extended for deployment, the strut first telescoping pin 63p is engaged with the strut second portion 64 and the strut first portion 62 to prevent telescopic movement of the strut first telescoping joint 63, and the strut first second pin 65p is engaged with the strut third portion 66 and the strut second portion 64 to prevent telescopic movement of the strut second telescoping joint 65.

Figure 17:
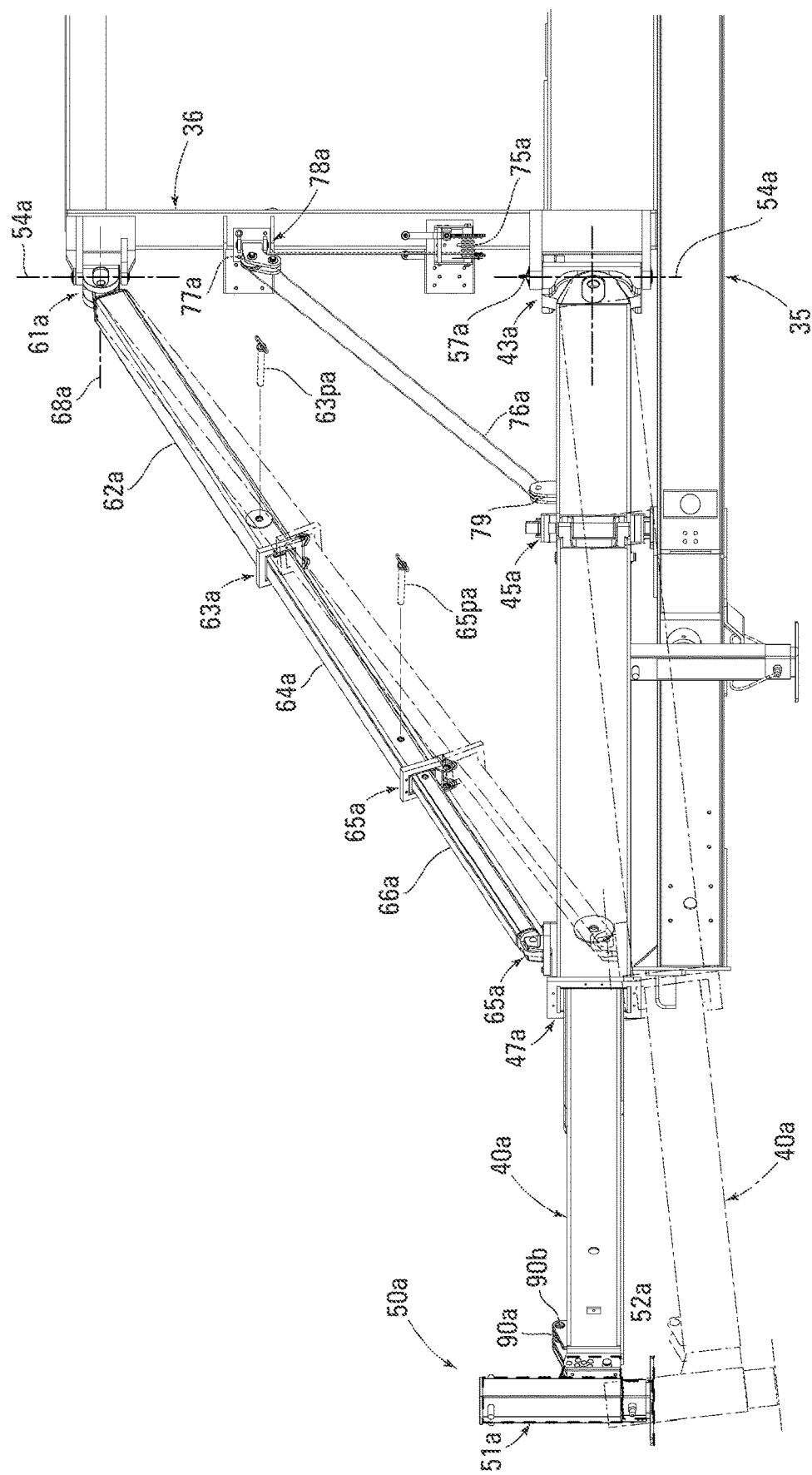
FIG. 17 is an enlarged side view of a portion of the trailer 35 of FIG. 7, but illustrating an outrigger 40a extended as in FIGS. 14 and 15, and further illustrating the function of a pivoting joint 43a which provides for vertical adjustment of the outrigger, showing an alternate position of the outrigger in phantom, and illustrating securing pins 63pa and 65pa of the a telescoping strut system.

The brace system 74a preferably includes a brace winch 75a and a brace wire 76a. The brace wire 76a is secured to the brace winch 75a which can wind and unwind the brace wire from the brace winch 75a. The brace wire 76a passes through a brace first pulley 77a which is attached to the frame 36 by a brace first pulley pivoting joint 78a which allows the brace system 74a to align with respect to the outrigger 40a as the outrigger 40a is extended and deployed. The brace wire 76a also passes through a brace second pulley 79a which is attached to the outrigger 40a; preferably, the brace second pulley 79a is attached to the outrigger first portion 44a. In this way, the brace system 74a functions as a block and tackle arrangement; by actuating the brace winch 75a, the outrigger 40a is raised or lowered as needed, as illustrated in FIG. 17.

Figure 18A:
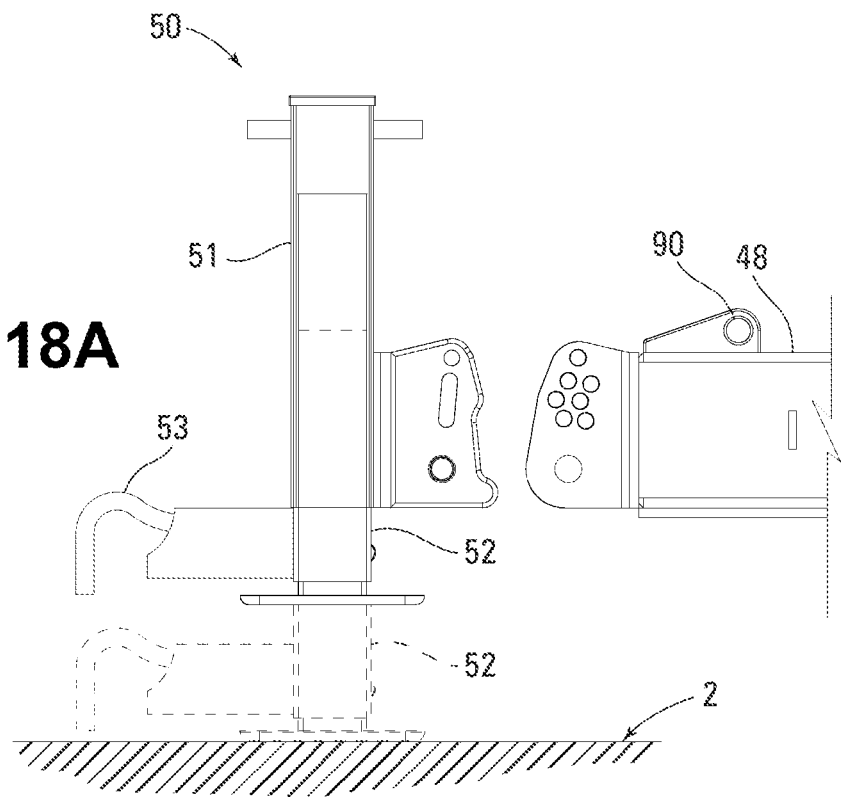
FIG. 18A is an enlarged partially exploded side view of a portion of the outrigger of FIG. 17, illustrating a telescoping ground-contact foot portion and an exploded rotating joint, showing the ground-contact foot portion telescopingly extended to contact the ground 2.
Figure 18B:
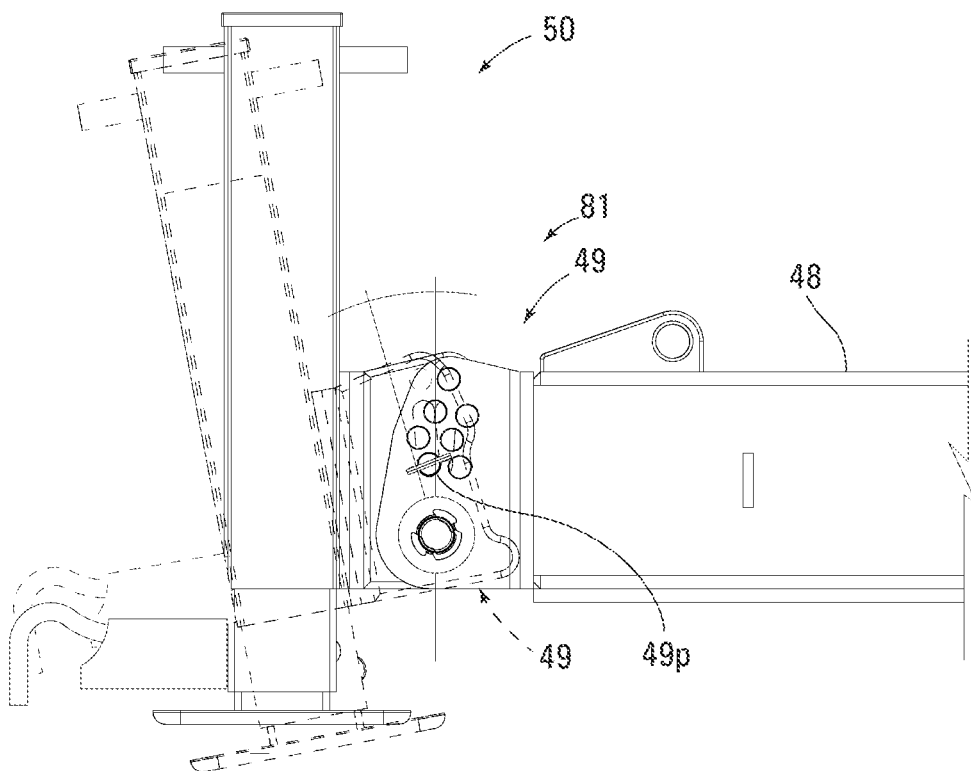
FIG. 18B is an enlarged view of a portion of the outrigger of FIG. 17 similar to the view of FIG. 18A, but not showing the exploded view, illustrating the rotating joint in a non-rotated position and illustrating the rotating joint in a rotated position in phantom, showing how the telescoping ground-contact foot portion is moveable by rotating the rotating joint.

The outrigger 40 preferably includes a foot portion 50 which pivots with respect to the outrigger third portion 48 at foot pivoting joint 49, and which is located proximate the outrigger end 81, as illustrated particularly in FIGS. 18A-18B. The foot pivot pin 49p can be disengaged to allow the foot portion 50a to pivot with respect to the outrigger third portion 48a at the foot pivoting joint 49a to orient the foot portion 50a for engagement with the ground 2; when the foot portion 50a is at the desired orientation, the foot pivot pin 49p is engaged to secure the foot portion 50a with respect to the foot pivoting joint 49a. The foot portion 50a preferably includes a foot jack 51a and a drop leg 52a and a drop leg pin mechanism 53a. The drop leg pin mechanism 53a can be disengaged to allow the drop leg 52a to telescope with respect to the foot jack 51a, and the drop leg pin mechanism 53a can be engaged to secure the drop leg 52a in position with respect to the foot jack 51a. The foot portion 50a preferably includes a foot plate or foot pad 52a for contact with the ground 2. This configuration provides a further adjustment for contact with the ground 2 in addition to raising or lowering the outrigger 40a by adjustment of the brace system 74a and actuation of the brace winch 75a. The foot portion 50a preferably includes a Bulldog® HD Square Trailer Jack, part number 182400, available from Cequent Performance Products, Inc., Plymouth, MI. Preferably, the general configuration for outriggers 40a, 40b, 40c, and 40d are similar, with corresponding outrigger first portions 44a, 44b, 44c, 44d, outrigger second portions 46a, 46b, 46c, 46d, outrigger third portion 48a, 48b, 48c, 48d, foot portion 50a, 50b, 50c, 50d, outrigger ends 81a, 81b, 81c, 81d, and so forth.

As described above, the brace system 74a functions as a block and tackle arrangement; by actuating the brace winch 75a, the outrigger 40a is raised or lowered as needed to allow the deployed outrigger 40a to contact the ground. With similar raising or lowering of the other deployed outriggers 40b, 40c, and 40d by brace systems 74b, 74c, and 74d, and adjustment of the foot portions 50b, 50c, and 50d, respectively, the outriggers 40 can be individually adjusted to accommodate the topography of the ground while orienting and stabilizing the mobile tower with support system 10 as desired.

The above description has particularly detailed aspects of the outrigger 40a, the strut system 60a, and the brace system 74a. As described above, the trailer 35 preferably includes outriggers 40b, 40c, and 40d, strut systems 60b, 60c, and 60d, and brace systems 74b, 74c, and 74d, which preferably extend and deploy and adjust in a similar manner to that illustrated and described in detail for outrigger 40a, strut system 60a, and brace system 74a, respectively, although some elements and the general configuration and movements of outriggers 40b and 40c, strut systems 60b and 60c, and brace systems 74b and 74c preferably are plane-reflected or "mirror-image" of those of outriggers 40a and 40d, strut systems 60a and 60d, and brace systems 74a and 74d, respectively, as can be seen in the drawing figures.

Preferably, after all four outriggers 40a, 40b, 40c, and 40d, strut systems 60a, 60b, 60c, and 60d, and brace systems 74a, 74b, 74c, and 74d are extended and deployed and adjusted, as illustrated in FIG. 14. Preferably, the outriggers 88 each extend to a deployed length of about 20 feet, so that the overall dimension of the mobile tower with support system 10 with the outriggers 88 deployed will fit within an approximately 40 foot by 40 foot area. Each outrigger 40 can have various dimensions, but one illustrative example configuration includes an outrigger first portion 44 about 56 inches in length, an outrigger second portion 46 about 103 inches in length, and an outrigger third portion 48 about 84 inches in length; similarly, the strut system can have various dimension which correspond to the dimension of the outriggers 40, but this illustrative example configuration includes a strut first portion 62 about 66 inches in length, a strut second portion 64 about 66 inches in length, and a strut third portion 66 about 66 inches in length. For applications in which a shorter extended height of tower 14 can be utilized, the tower 14, the series 15, the outriggers 40, the strut systems 60, and other components described herein can be correspondingly smaller in dimension.

The foot pads 52a, 52b, 52c, and 52d are adjusted by actuation of the foot pivoting joints 49a, 49b, 49c, and 49d and the foot pad telescoping joints 51a, 51b, 52c, and 52d as illustrated in FIGS. 18A-18B so that the respective foot pads 52a, 52b, 52c, and 52d contact the ground 2 to support and stabilize the mobile tower with support system 10.

Figure 19:
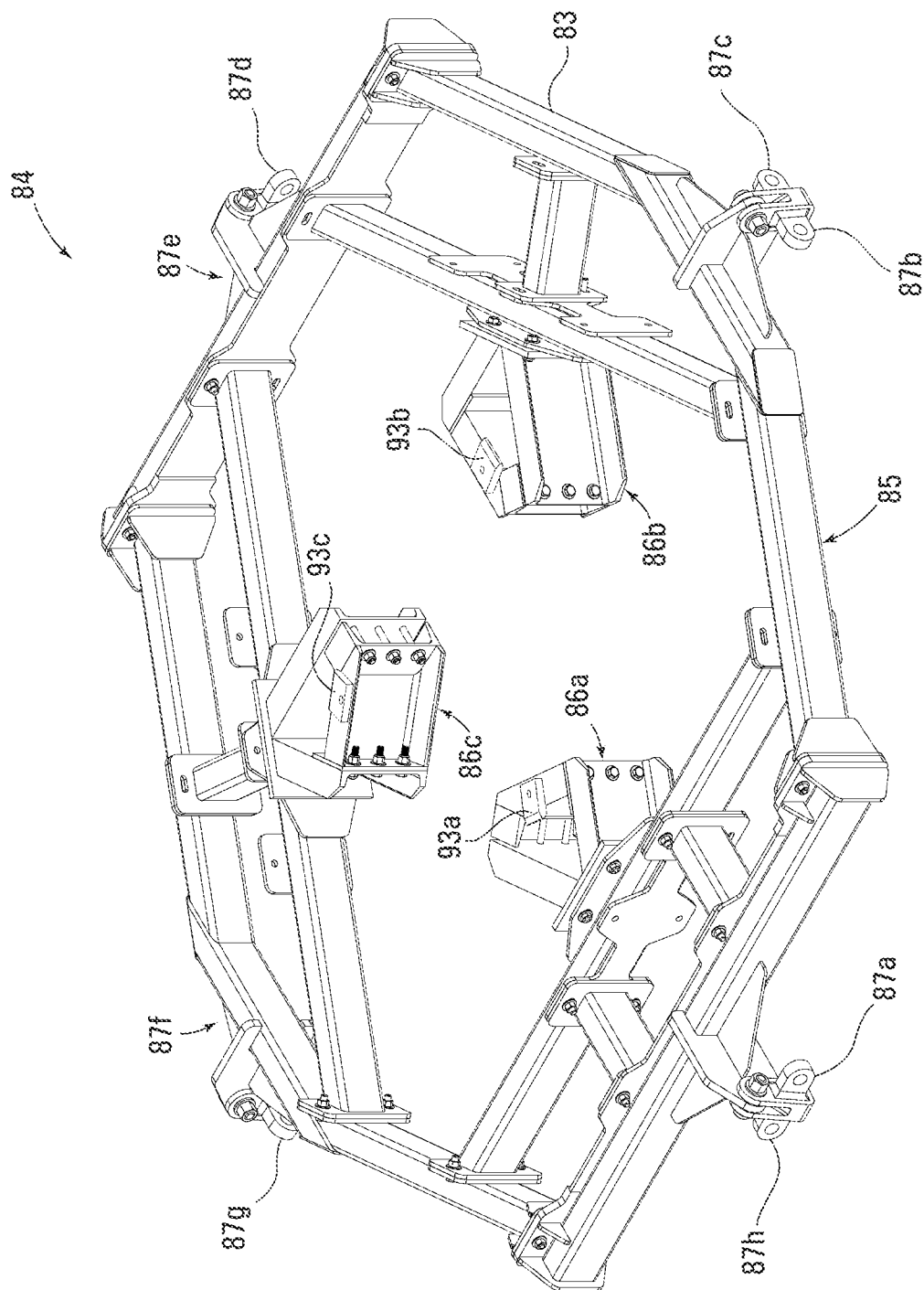
FIG. 19 is a perspective view of a portion of a rigging system 84, illustrating a rigging apparatus 85.
Figure 20:
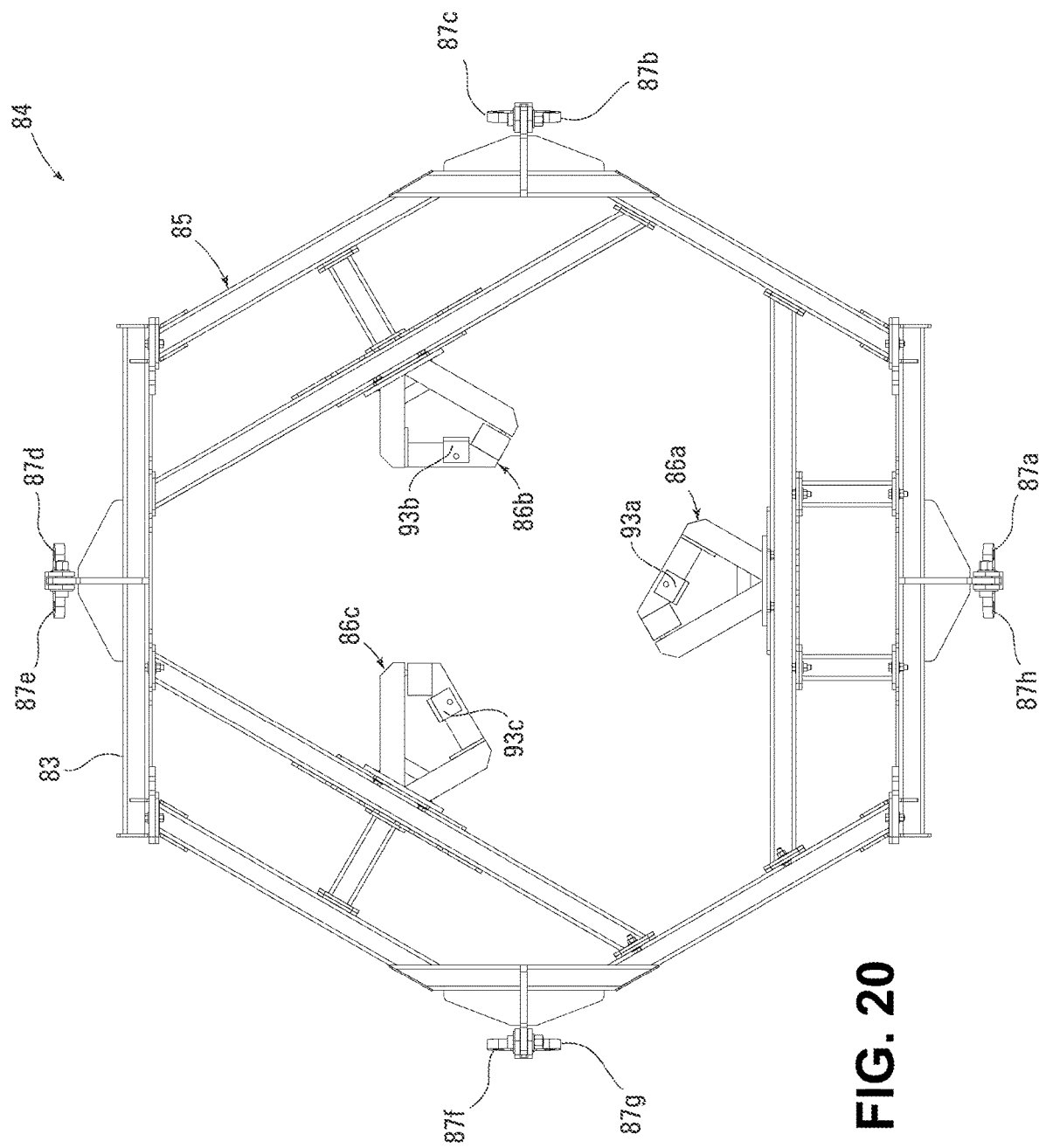
FIG. 20 is a top view of the rigging apparatus 85 of FIG. 19.
Figure 21:
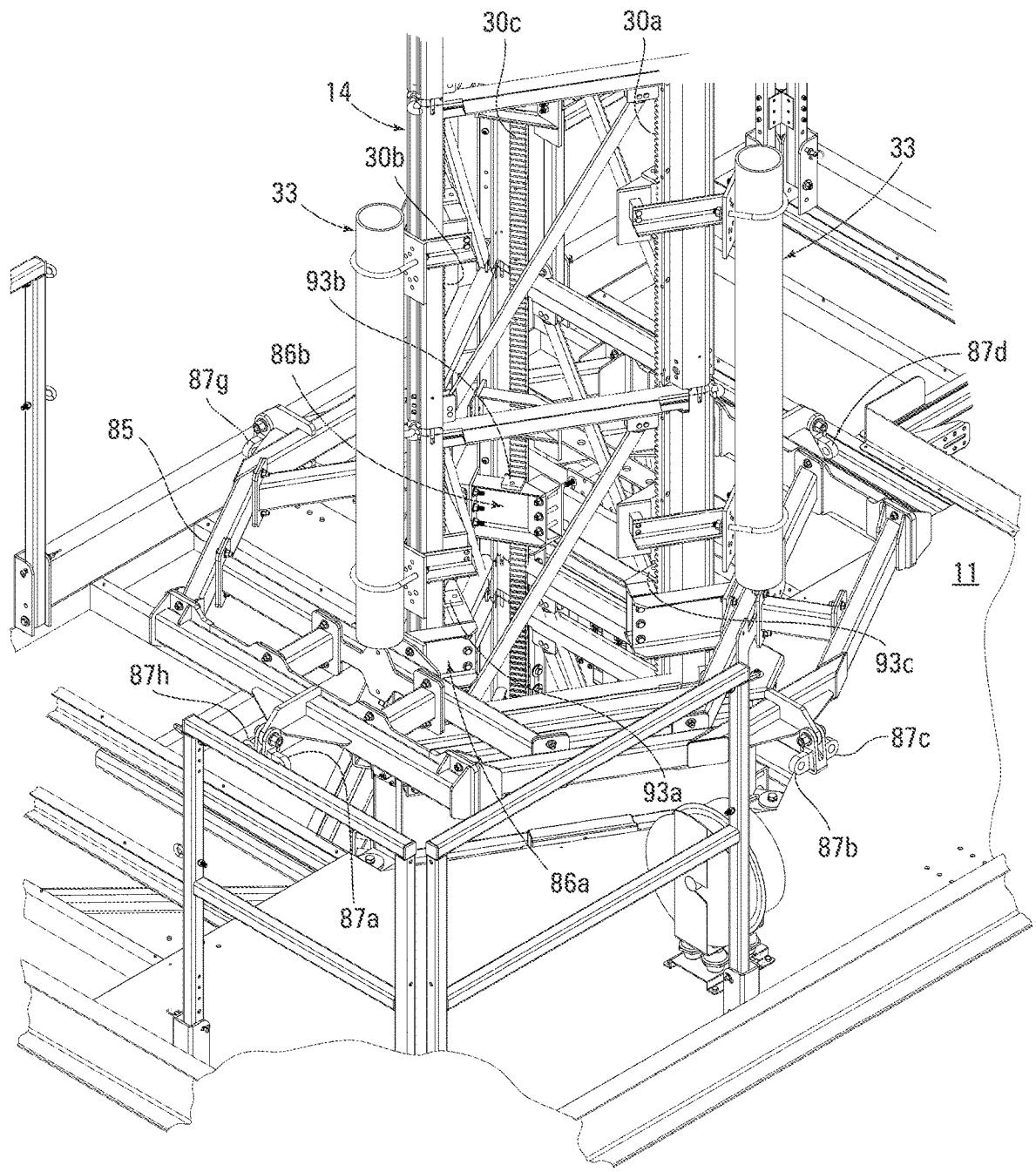
FIG. 21 is a perspective view of a portion of the mobile tower, with the tower 14 partially extended as in FIG. 4, illustrating a portion of the rigging apparatus 85 secured to the tower or tower mast 14.

The mobile tower with support system 10 preferably includes a rigging system 84, including rigging apparatus or guy wire torque ring 85 as illustrated in FIGS. 19-20. After the outriggers 40, the strut systems 60, the brace systems 74, and the foot pads 52 are adjusted and deployed, the tower 14 is preferably partially extended about 10 feet to a "maintenance height" convenient for attachment or other manipulation of apparatus, such as the rigging apparatus 85, the rigging system 84, or the payload support apparatus 33. With the tower partially extended, the rigging apparatus 85 is attached to the tower 14 by securement apparatus 86 as illustrated in FIG. 21. Preferably, the securement apparatus 86 includes an engagement element or tooth 93, which engages a portion of each rack 30 (see FIGS. 21 and 26A, for example) of the respective tower segments 16 at the desired location for attachment of the rigging apparatus 85. The rigging apparatus 84 can be attached to the tower 14 at various locations along the tower 14, but preferably the rigging apparatus 84 will be attached to the tower 14 about 10 feet from the top of the tower 14; for a typical tower height of 80 feet, the rigging apparatus will be preferably attached to the tower 14 at a location that is about 70 feet above the ground. The mobile tower with support system 10 preferably includes guy wire upper attachment features 87a-87h. In some embodiments, the tower 14 can include the upper attachment features 87a-87h, but preferably, the rigging system 84 includes the guy wire upper attachment features 87a-87h. Preferably, the trailer 35 includes guy wires 88 (further described below), which attach to the rigging system 84 and to each of the outriggers 40. As illustrated on the figures, the tower 14 preferably has a generally three-sided configuration, and there are preferably four outriggers 40. The rigging apparatus 85 preferably encircles the tower 14 to provide support and stability for the tower when deployed. The rigging apparatus 85 also provides for attachment of 4 opposed pairs of guy wires 88 to the three-sided tower for attachment to the four outriggers 40. In this way, the rigging system 84, which includes the rigging apparatus 85 and the guy wires 88 attached to the outriggers 40 can provide enhanced support and stability for the tower 14 while taking advantage of the four outriggers 40, as will be further described below.

Figure 23A:
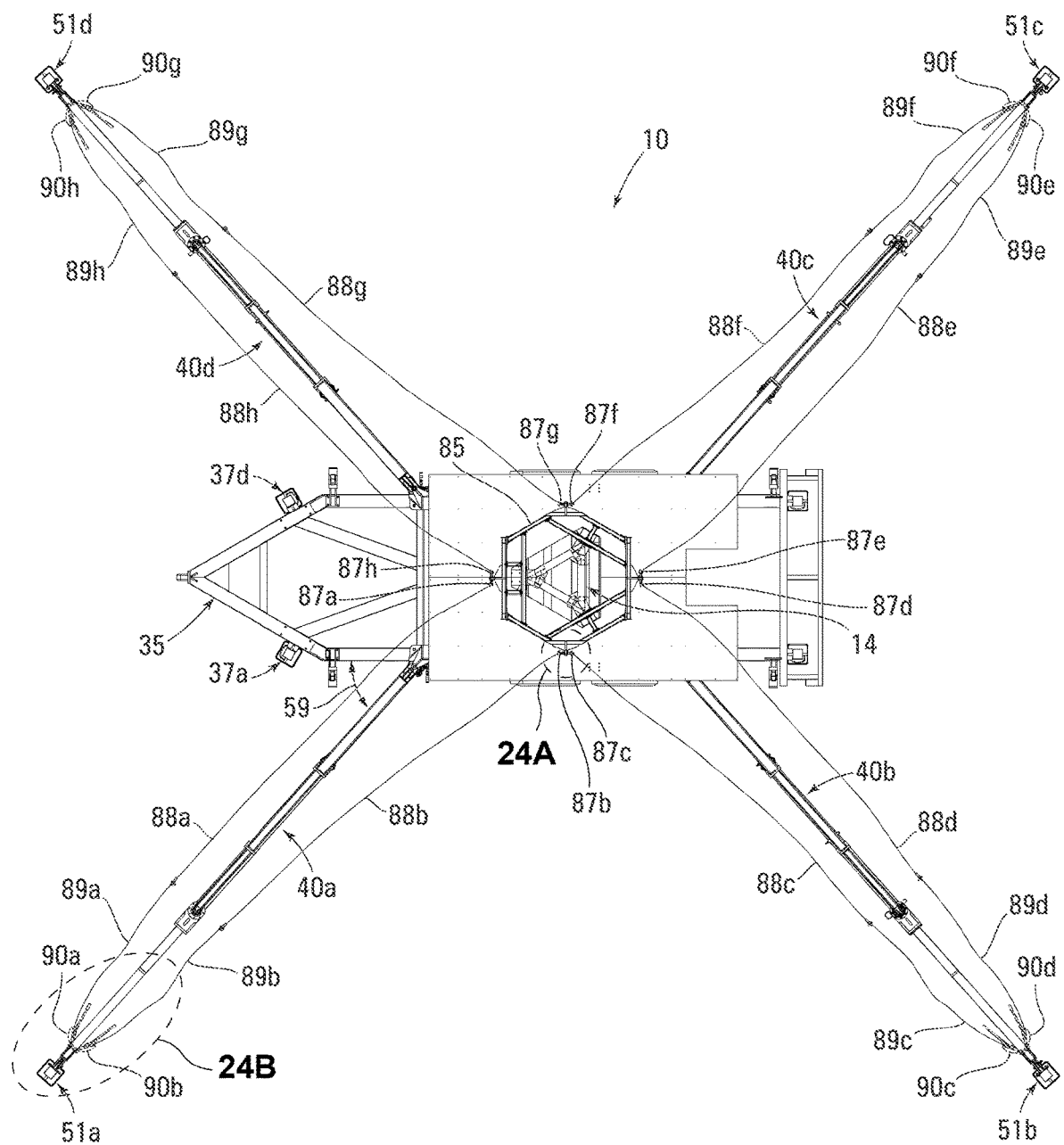
FIG. 23A is a top view of the mobile tower shown in FIGS. 4 and 22, but not showing the tower top platform 12, wherein the rigging system is shown with the guy wires attached to the outer perimeter 83 of the rigging apparatus 85 and the respective outriggers 40a-40d, but not tensioned or taut.
Figure 23B:
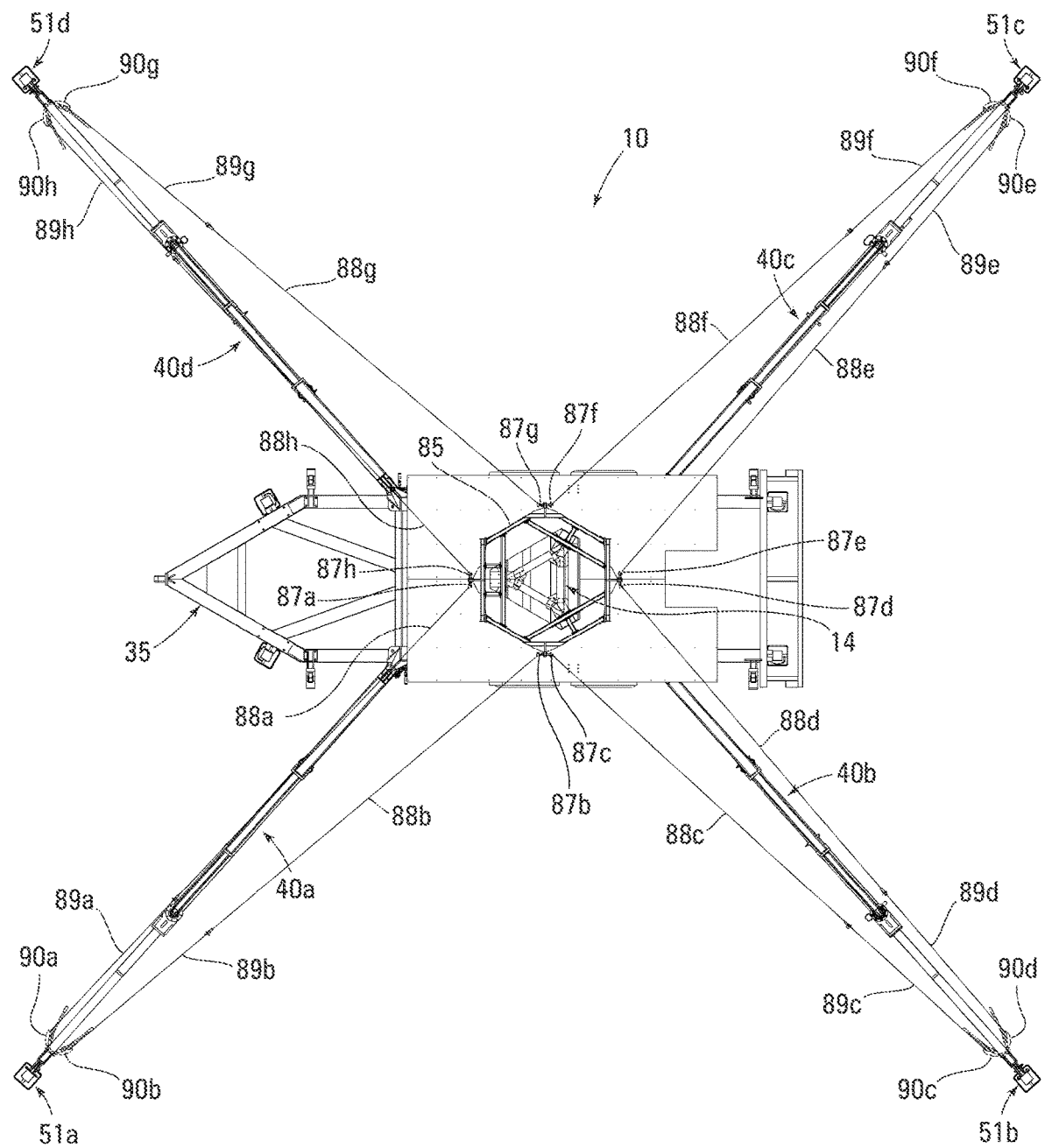
FIG. 23B is a top view of the mobile tower shown in FIG. 5, but not showing the tower top platform 12, wherein the rigging system is shown as shown in FIG. 23A, but with the guy wires between the outer perimeter of the rigging apparatus and the respective outriggers tensioned or taut.
Figure 23C:
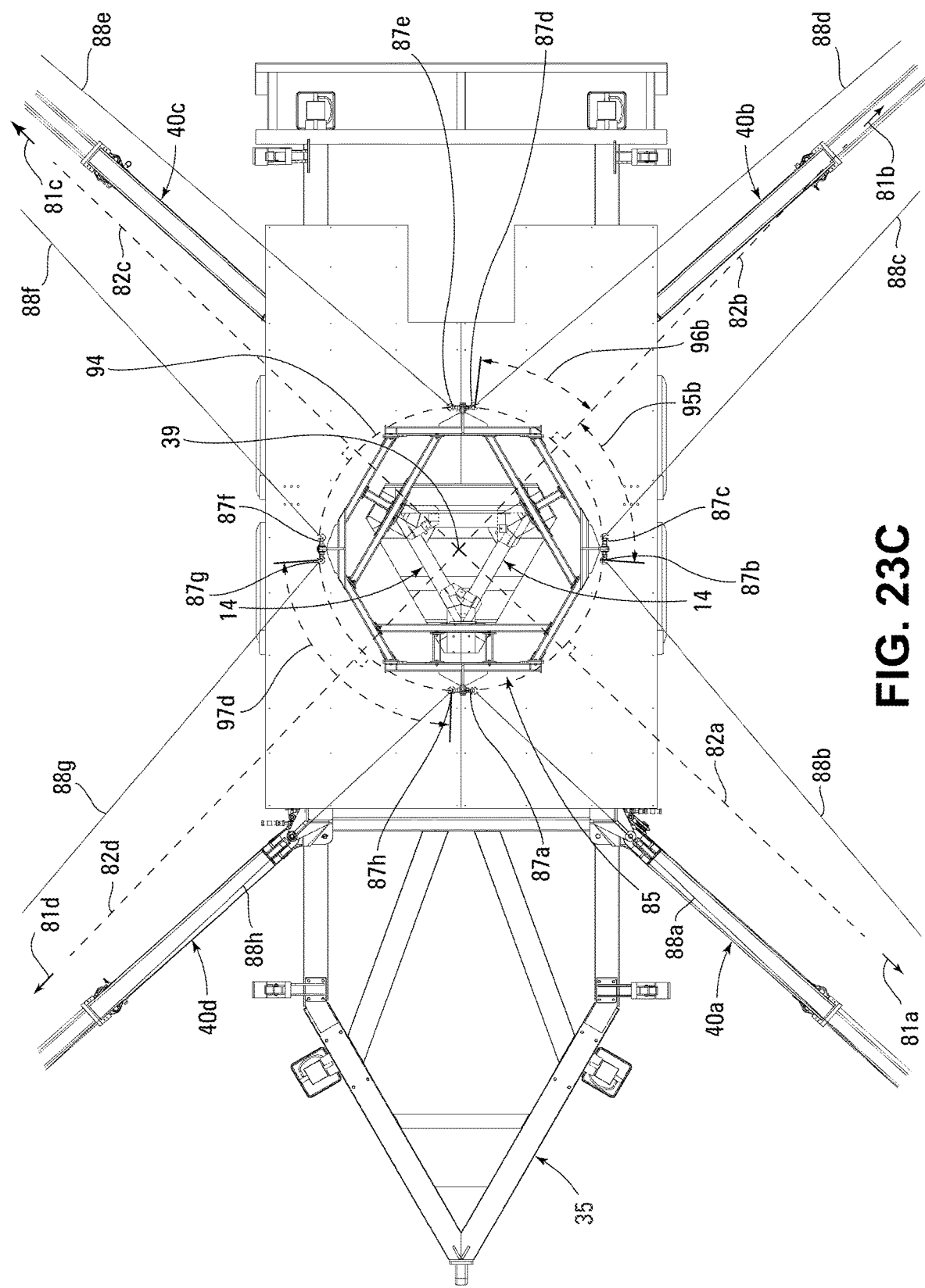
FIG. 23C is an enlarged top view of a portion of the mobile tower as shown in FIG. 23B, illustrating the locations of upper guy wire attachment features 87a-87h.
Figure 24A:
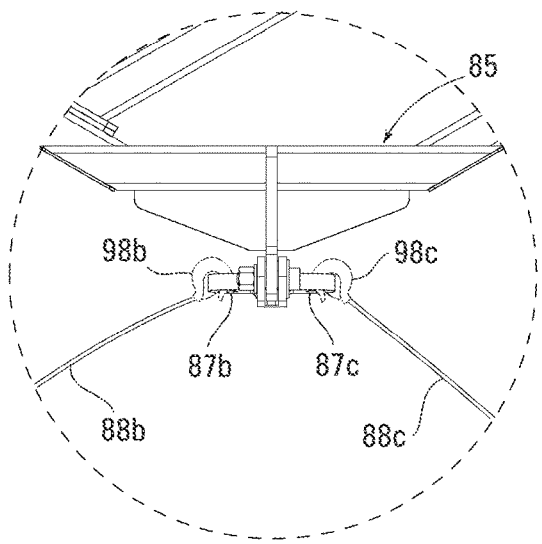
FIG. 24A is an enlarged detailed portion of the rigging system 84 shown in the dashed circle 24A shown in FIG. 23A, illustrating the first ends of each of two guy wires each attached guy wire upper attachment features of the rigging apparatus.

After the rigging apparatus 85 is attached to the tower 14 by engaging the securement apparatus 86 to the tower 14, guy wires 88a-88h are attached the outer perimeter 83 of the rigging apparatus 85, by securing the respective guy wires 88a-88h to guy wire upper attachment features 87a-87h, each of which is preferably a flange in which a hole is provided for attachment of a first end 91 of each guy wire 88, which preferably includes a hook 98, which can be inserted into the respective hole so as to engage the flange 87a-87h, as illustrated in FIGS. 22-24A (see hooks 98 in FIG. 24A). Each guy wire 88 is preferably an elongated wire or cable structure which provides strength in tension and has a first end 91 and a second end 92, with the first end 91 adapted to attach to the guy wire upper attachment feature 87, as illustrated in FIG. 24A, and the second end 92 adapted to attach to a come-along 89, which is preferably attached by a hook 99 to an outrigger 40 at a come-along attachment feature 90, which is preferably a flange 90 in which a hole is provided, so as to preferably enable the respective hook 99 to be inserted into and engaged within the hole in the respective flange 90, as illustrated in FIG. 24B. The guy wire upper attachment features or connecting positions 87 preferably include hooks, loops, bars, holes, or other similar structure adapted for attachment of the first end 91 of the guy wire 88. Similarly, the first ends 91 of the respective guy wires 88a-88h may include hooks, loops, bars, or other similar structure adapted for attachment to the guy wire upper attachment features or connecting positions 87a-87h, preferably hooks 98. The guy wire upper attachment features 87 are preferably displaced from one another and are located on the outer perimeter 83 of rigging apparatus 85 which preferably encircles the tower 14 when attached, as described above. This arrangement provides a greater distance or displacement between the guy wire upper attachment features 87 and the tower 14, thereby providing greater torque effectiveness for the guy wires 88, when attached and tensioned as describe herein, to better resist twisting or torsion loads which may be applied, such as by the wind impinging upon a payload 6 mounted on a tower top platform 12 or the payload support apparatus 33, for example, than would be provided if the guy wires 88 were attached directly to the tower segments 16 of the tower or tower mast 14. Furthermore, the attachment of the guy wires 88 to connecting positions or guy wire upper attachment features 87a-87f that are displaced from one another as discussed herein, enables the rigging system 84 to provide greater resistance to twisting or torsion loads.

Figure 24B:
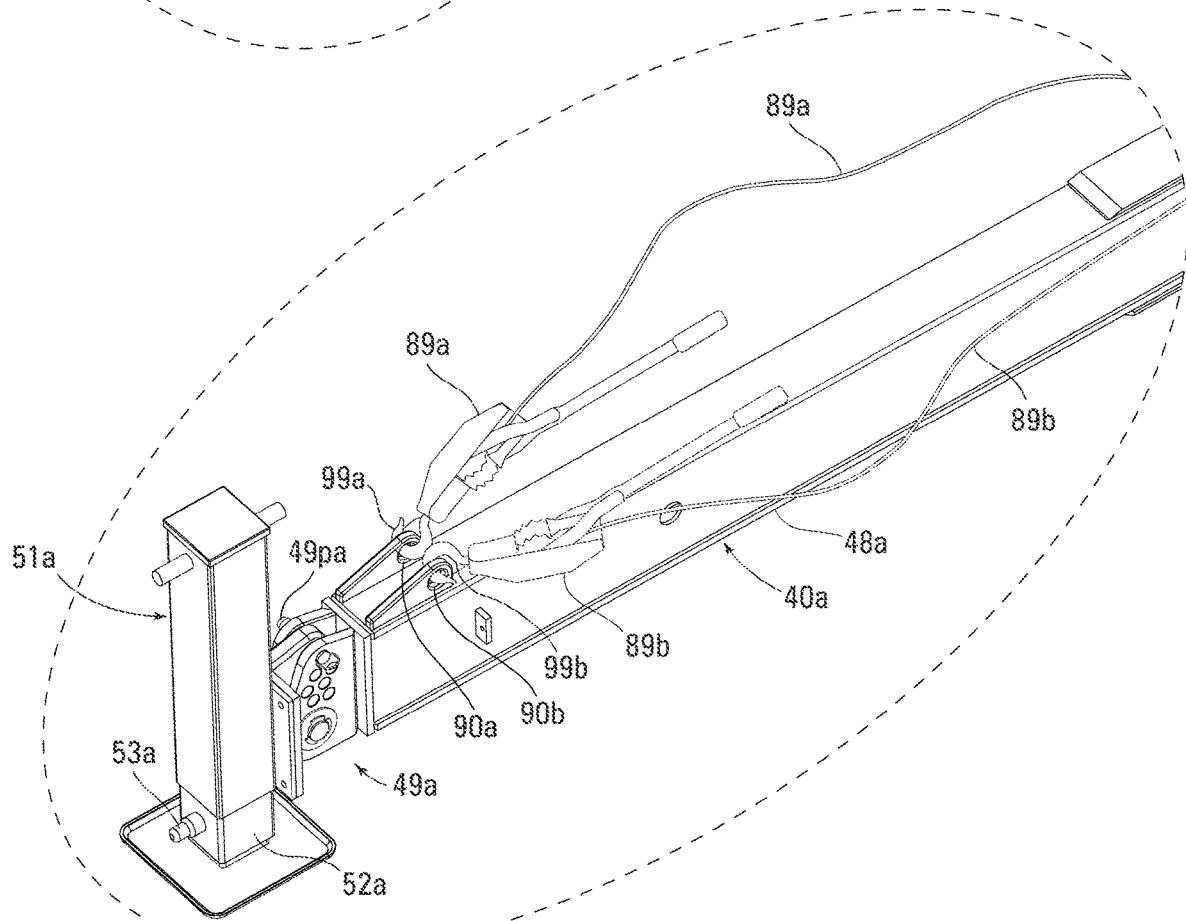

The come-along 89 will preferably have a come-along attachment feature 90 are preferably holes as shown in FIG. 24b include hooks, but could alternately include loops, bars, or other similar structures adapted for attachment of the come-along 89 to the respective outrigger 40. The come-along 89 preferably includes hooks, loops, other similar structure adapted for attachment of the second end 92 of the guy wire 88. Preferably, the first end 91 and the second end 92 of each guy wire 89 are adapted for connection to guy wire upper attachment feature 87 and the come-along 89, respectively. After each guy wire 88 is attached to the respective guy wire upper attachment feature 87, and preferably to the respective come-along 89, which is attached to the respective outrigger 40 via the respective come-along attachment feature, the tower 14 is extended further. When the tower 14 is extended to a desired deployed height for use, each come-along 89 is used to release or take up slack in the respective guy wire 88 to which the come-along 89 is attached and to adjust the tension in the respective guy wire 88.

Alternatively, the tower 14 can include upper attachment features 87, without the rigging apparatus 85, so that the guy wires 88 are secured to the tower 14; preferably, however, the rigging apparatus 85 is used as described. In other alternative configurations, some of the guy wires 88 can be attached via the rigging apparatus 85 as described herein, and other of the guy wires 88 can be attached directly to the tower 14; for example, a set of the guy wires 88 can be attached to the tower 14 at an intermediate location lower than the location at which the rigging apparatus 85 is attached to the tower 14. In yet other alternative configurations, more than one rigging apparatus 85 can be used, at more than one height along the tower 14. In still other alternative configurations, some of the guy wires 88 can be attached directly to the tower 14 at a location near the top of the tower 14, and other of the guy wires 88 can be attached directly to the tower 14 at a location lower on the tower 14.

The outriggers 40 are preferably deployed in a generally X configuration with respect to the trailer 35, as illustrated in FIG. 23A, with an outrigger 40 extending outward from the trailer 35 and with one outrigger near each corner of the trailer 35. The guy wire upper attachment features 87a-87h are preferably located at locations on the rigging apparatus 85 which are oriented more at the sides and ends of the trailer as shown.

Figure 25:
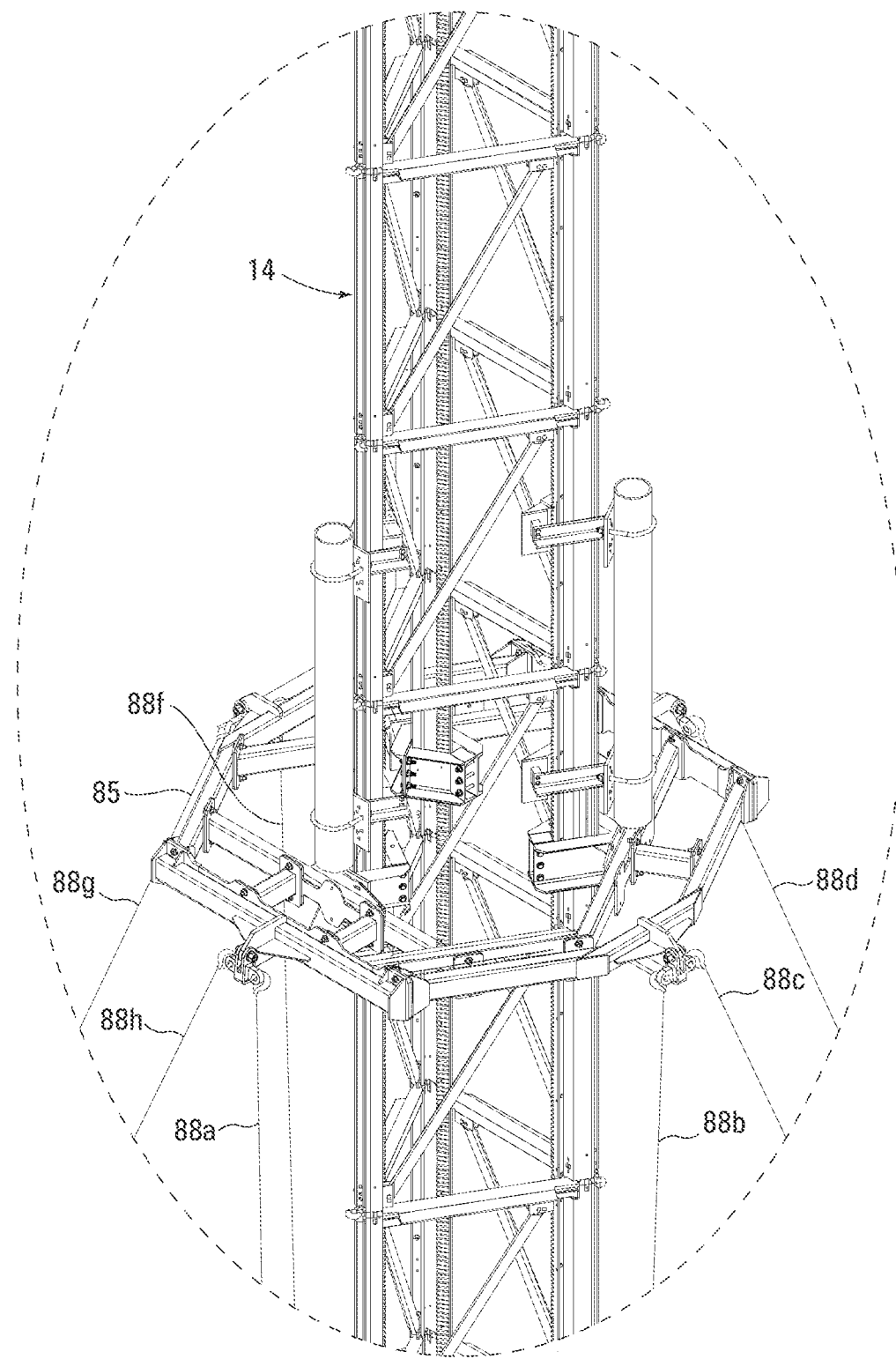
FIG. 25 is an enlarged perspective view of a portion of the mobile tower shown in the dashed oval 25 shown in FIG. 5.

After the guy wires 88 have been attached as described above, the tower 14 is further extended to a height desired for the particular application for which the tower 14 is to be utilized, and the tension in each guy wire 88 is adjusted by manipulation of the respective come-along 89, resulting in the configuration depicted in FIGS. 5, 23B, and 25.

The guy wires 88 are preferably arranged in generally opposed pairs as illustrated in FIG. 23B to provide support and stability to the tower 14 against various loads which may be applied, for example, by the wind. For example, the guy wire upper attachment feature 87b is near the guy wire attachment feature 87c, but whereas guy wire 88b is preferably attached to guy wire upper attachment feature 87b and to come-along 89b which is attached to outrigger 40a via come-along attachment feature 90b, the guy wire 88c is preferably attached to guy wire upper attachment feature 87c and to come-along 89c which is attached to outrigger 40b via come-along attachment feature 90c. This arrangement provides a generally opposed pair of guy wires 88b and 88c which are ultimately attached to opposed outriggers 40b and 40c. Thus, a load applied to the tower 14 in a direction that would tend to increase tension in the guy wire 88b (and decrease tension in the guy wire 88c) would be resisted by the guy wire 88b which is attached to the outrigger 40a, while a load applied to the tower 14 in an opposite direction that would tend to increase tension in the guy wire 88c (and decrease tension in the guy wire 88b) would be resisted by the guy wire 88c which is attached to the outrigger 40b. Similarly, the pairs of guy wires 88d and 88e, 88f and 88g, and 88h and 88a, are attached (via respective come-alongs 89 and come-along attachment features 90) to opposed pairs of outriggers 40b and 40c, 40c and 40d, and 40d and 40a, respectively, and provide support and stability to the tower 14 against loads which may be applied in a direction or orientation which may vary with location or with time, such as wind loading which may be more prevalent from the front of the trailer 35 in one location at which the mobile tower having support system 10 is deployed, and more prevalent from the rear of the trailer 35 in another location at which the mobile tower having support system 10 is deployed, for example, or wind loading which varies in direction over time, from one side and later from another side of the trailer 35, as the wind varies over time, for example.

Preferably, the guy wire upper attachment features 87a-87h are located approximately equidistant from a tower vertical axis 39, and therefore lie approximately on a horizontal circle 94 which is centered on the tower vertical axis 39, as illustrated in FIG. 23C. The come-along attachment features 90a-90h are preferably located proximate the respective outrigger ends 81a-81d. The guy wire 88, when attached to the respective come-along 89, connects between the respective guy wire upper attachment feature 87 and the respective come-along attachment feature 90. An outrigger orientation line 82 (82a, 82b, 82c, 82d) is defined as extending from the respective outrigger end 81 and intersects perpendicularly with the horizontal circle 94 and also intersects with the tower vertical axis 39, as illustrated in FIGS. 23B-23C. Preferably, there is a pair of two guy wires 88 and corresponding come-alongs 89 attached to each outrigger 40 proximate the respective outrigger end 81, with corresponding guy wire upper attachment features 87 and come-along attachment features 90. A first angular displacement 95 (95a, 95b, 95c, 95d) is defined as the angular extent of the arc portion of the horizontal circle 94 from the outrigger orientation line 82 to the respective guy wire upper attachment feature 87 to which one of the pair of guy wires 88 associated with a particular outrigger 40 is attached, and a second angular displacement 96 (96a, 96b, 96c, 96d) is defined as the angular extent of the arc portion of the horizontal circle 94 from the outrigger orientation line 82 to the respective guy wire upper attachment feature 87 to which the other of the pair of guy wires 88 associated with a particular outrigger 40 is attached. Accordingly, a third angular displacement 97 (97a, 97b, 97c, 97d) is defined as the angular extent of the arc portion of the horizontal circle 94 from the guy wire upper attachment feature 87 to which one of the pair of guy wires 88 associated with a particular outrigger 40 is attached to the guy wire upper attachment feature 87 to which the other of the pair of guy wires 88 associated with a particular outrigger 40 is attached.

Figure 27:
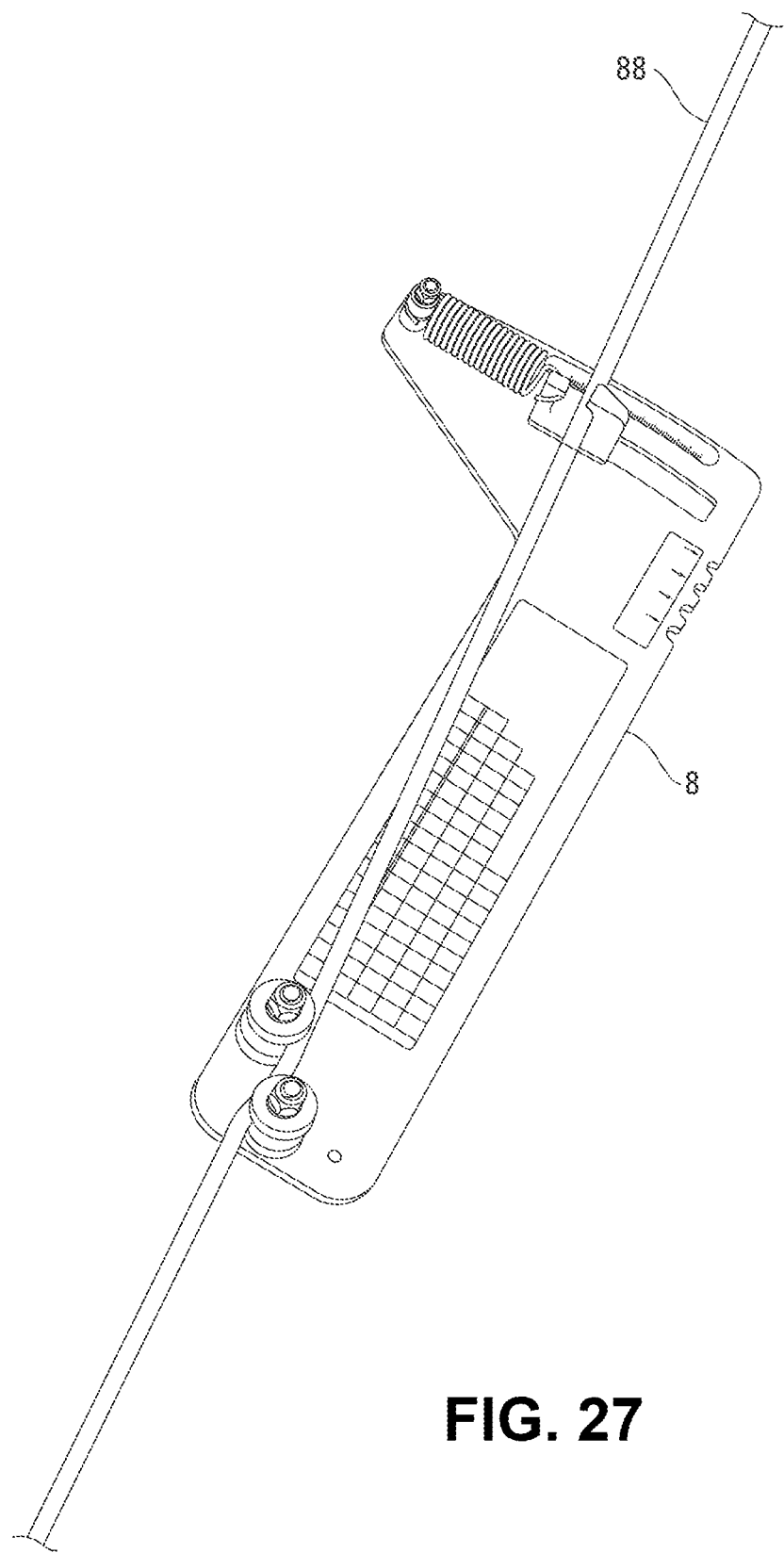
FIG. 27 is a perspective view of a tension measurement device or tool 8 engaging a guy wire 88 to measure the guy wire tension.

The tension in each guy wire 88 guy wire can be measured, for example, using a device such as the tension measurement device 8 illustrated in FIG. 27. An example of a suitable device is a tension gauge such as item PT-3 from Lexco Cable Mfg., Norridge, IL. Another example is a tension gauge model PT-2 from Loos & Co., Pomfret, CT. The guy wire 88 preferably includes 5/16 inch 1×7 cable, such as may be obtained from Lexco Cable Mfg., Norridge, IL, or alternatively from Loos & Co., Pomfret, CT. Other configurations can be used, such as ¼ inch or ⅜ inch diameter wire can be used, but the 5/16 inch 1×7 configuration is preferred to reduce stretching when tension is applied to the guy wire 88; the cable is preferably pre-stretched, also to reduce stretching when tension is applied to the guy wire 88. The length of the guy wire 88 is chosen according to the height of the tower 14 and the dimensions of the outriggers, but commonly a 70-foot length of cable is used for each guy wire 88. Various numbers of guy wires 88 can be utilized, but there are preferably twice the number of guy wires as there are outriggers, so that opposed pairs of guy wires 88 can be used, as described above. It is even possible to use the mobile tower having support system 10 without the rigging system 84 and the guy wires 88, for example, when no significant wind loading is present, but it is preferable to use the guy wires 88 for enhanced support and stability for the extended tower 14. The tension in the guy wires 88 is preferably adjusted to less than about 15% of the rated strength of the cable used; more preferably, the tension in the guy wires 88 is adjusted to less than 10% of the rated strength of the cable used in order to minimize the downward force on the tower 14 applied by the guy wires 88. For example, the tension in the guy wires 88 is preferably adjusted to from about 240 to about 2000 pounds, preferably from about 300 to about 1400 pounds, more preferably from about 400 to about 1000 pounds, even more preferably from about 500 to about 800 pounds and most preferably from about 650 to about 700 pounds.

It will also be appreciated that in certain alternate embodiments of the present invention, the extendable retractable tower 114 (see FIG. 28) will be secured to an alternate frame 136 that is not a part of a trailer. Such a tower 114 can alternately include pockets (not shown) for a forklift pick-up to enable movement of the frame 136, to which the tower 114 is secured, from one location to another. It will be appreciated that this alternate frame 136 will have most of the components of the frame 36 shown in the drawings, but that it will not have wheels 34 as the preferred trailer 35, shown in the drawing figures, has. Such an alternate tower 114 secured to an alternate frame 136 is envisioned as a part of the present invention. Furthermore, such an alternate tower 114, need not be secured by guy wires 188, depending upon the height of the tower and the wind and other conditions at the site where the tower is deployed and erected.

The loading of the tower 14 and the guy wires 88 is further influenced by wind and an effective "sail area" of the payload 6 and the payload support apparatus 33 which is attached to the tower 14. Preferably, the tower 14 can be extended to a height of about 80 feet, and with the rigging system 84 attached and the guy wires 88 secured to the deployed outriggers 40, the mobile tower having support system 10 can support a 90 mile per hour wind with a "sail area" of about 103 square feet, while supporting a payload weight of about 2000 pounds, for example.

Figure 26A:
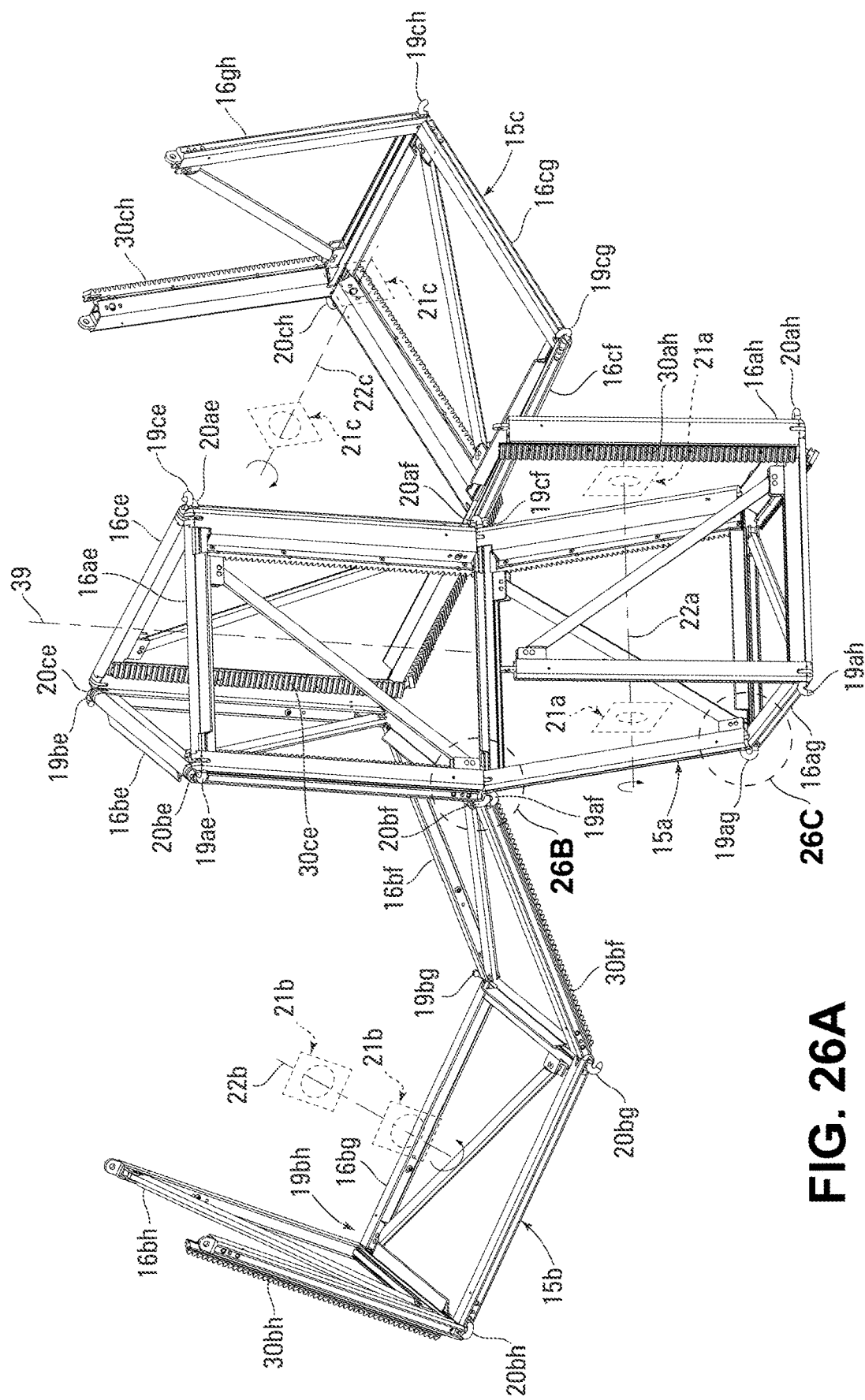
FIG. 26A is a perspective view of a portion of the tower 14 of FIG. 4, illustrating portions of three distinct chains 15 of pivotally interconnected tower segments 16, showing tower segments in each of the three segment chains 15 engaging with tower segments 16 in other of segment chains 15 to form a tower story 38 as would occur as the tower 14 is extended during deployment, and providing indications relating to an axis of rotation of each of the three tower segment chains 15.
Figure 26B:
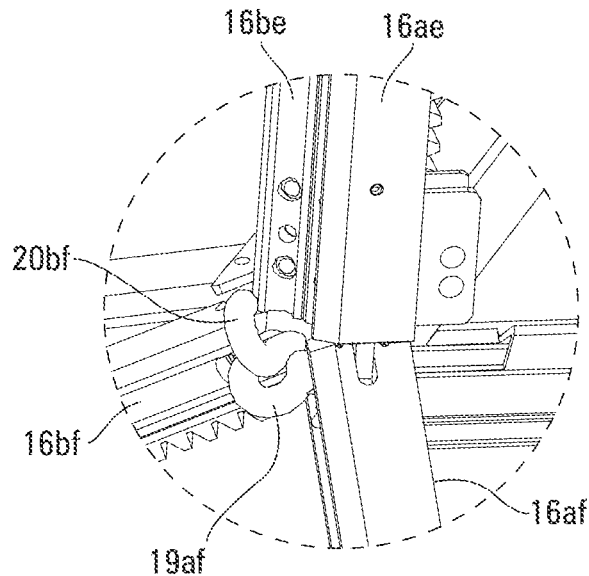
FIG. 26B is an enlarged perspective view of a portion of the mobile tower shown in the dashed circle 26B in FIG. 26A, illustrating a hook 19af of one tower segment 16 of one of the segment chains 15 engaging a hook 20bf of another tower segment 16 of a different segment chain on corresponding tower segments of another of the three different segment chains 15.

The mobile tower having support system 10 preferably includes at least three series of pivotally interconnected tower segments 15 (which may also be referred to herein as "series 15" or "chains 15"). The mobile tower having support system 10 illustrated in the drawings show three series of pivotally interconnected tower segments 15a, 15b, and 15c. Each of the respective series 15 includes many tower segments 16 as shown. For ease of reference, the individual tower segments 16 may be specifically referred to, with series 15a including tower segments 16aa-16an, series 15b including tower segments 16ba-16bn, and series 15c including tower segments 16ca-16cn. Each tower segment 16 is connected to its neighboring tower segment 16 in the respective series 15 by a first intersegment pivoting joint 17 and a second intersegment pivoting joint 18 as illustrated best in FIGS. 26A-26C. Note that FIG. 26A shows only portions of each of the three series 15a, 15b, and 15c, including four of the tower segments 16 of each of the respective series 15a-15c to more clearly illustrate the structure and function; while FIGS. 1-5 illustrate all of the tower segments 16aa-16an, 16ba-16bn, and 16ca-16cn of the series of pivotally interconnected tower segments 15a, 15b, and 15c, respectively (although the view of some of the tower segments 16 is obstructed by other structures). As can be seen particularly in FIG. 26A, the first intersegment pivoting joints 17 and the second intersegment pivoting joints 18 are configured and arranged to allow the adjacent tower segments 16 in a series 15 to pivot with respect to each other, so that the series 15 can be folded or rolled up. Each series of pivotally interconnected tower segments 15 is preferably attached to a hub assembly 21 which is supported by a hub support apparatus 29 which accommodates movements of the respective series 15 as the segments pivot to roll up or unroll the series 15. As the series 15 is rolled up or unrolled, the hub assembly rotates generally about a hub axis 22.

Figure 26C:
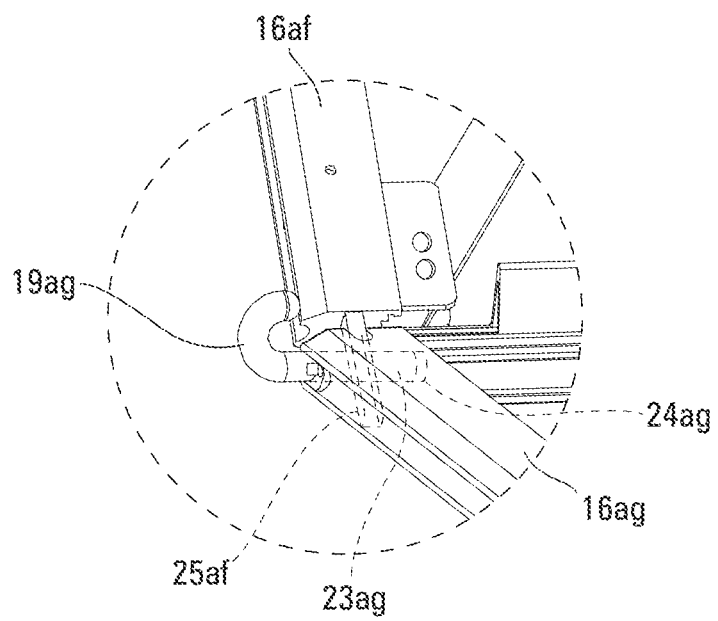
FIG. 26C is an enlarged view of a portion of one of the segment chains 15 shown in the dashed circle 26C of FIG. 26A, showing a hook 19ag partially in phantom, when engaged with adjacent tower segments 16af and 16ag to pivotally connect the two tower segments, which are also shown partially in phantom.

Each of the first intersegment pivoting joints 17 preferably includes a first hook 19. Each of the second intersegment pivoting joints 18 preferably includes a second hook 20. Each tower segment 16 preferably includes a first shank recess 24 and a first shank aperture 25 and a second shank recess 26 and a second shank aperture 27. Each first hook 19 preferably includes a first shank portion 23 which engages the first shank recess 24 in one of the tower segments 16 and rotatingly engages the first shank aperture 25 in an adjacent tower segment 16, and each second hook 20 preferably includes a second shank portion 26 which engages the second shank recess 27 in one of the tower segments 16 and rotatingly engages the second shank aperture 28 in an adjacent tower segment 16. Preferably, the first hook 19 and the second hook 20 are each secured to the respective tower segment 16 so that the first shank portion 23 and the second shank portion 26 remain in fixed positions relative to the first shank recess 24 and the second shank recess 27, respectively, while the first shank portion 23 and the second shank portion 26 are free to rotate with respect to the first shank aperture 25 and the second shank aperture 28, respectively, when the adjacent tower segments 16 in each series 15 pivot with respect to each other and the series 15 is rolled or unrolled. As an example, the arrangement of the first hook 19ag having a first shank portion 23ag secured to the tower segment 16ag at first shank recess 24ag and also secured to the tower segment 16af at first shank aperture 25af to pivotably secure the tower segment 16af and the tower segment 16ag is illustrated in FIG. 26C; the arrangement of the second hook 20ag is similar, with the second hook 20ag having a second shank portion 26ag secured to the tower segment 16ag at second shank recess 27ag and also secured to the tower segment 16af at second shank aperture 28af to pivotably secure the tower segment 16af and the tower segment 16ag.

Figure 22:
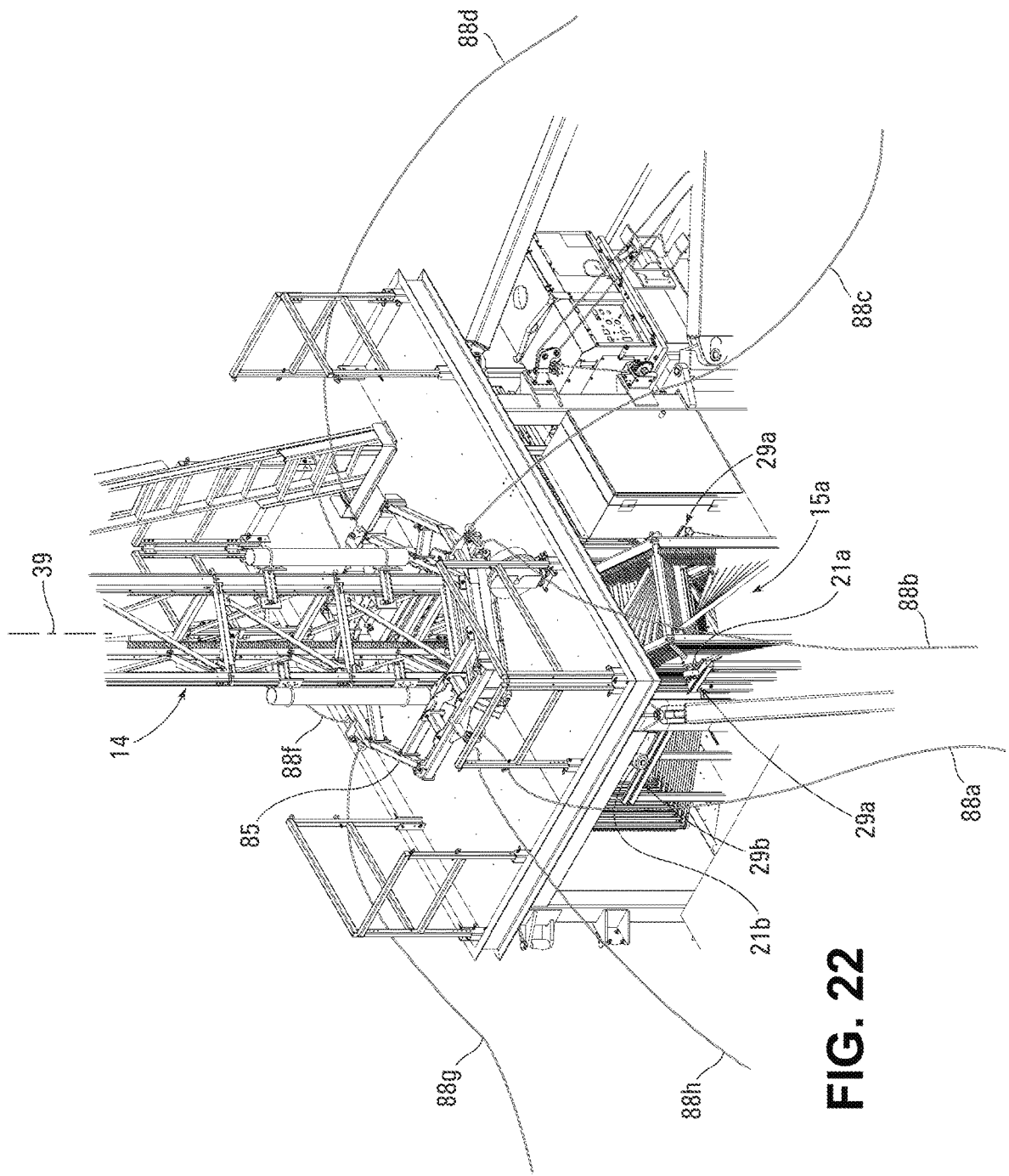
FIG. 22 is a further perspective view of a portion of the mobile tower similar to that of FIG. 4, but enlarge to show further detail, with most of the guy wires 88a-88d and 88f-88h attached to connecting positions or upper attachment features 87 (namely, 87a-87h in FIG. 20) on an outer perimeter 83 of the rigging apparatus 85.

The first hook 19 and the second hook 20 preferably are further configured and arranged so that the first hook 19 of one of the tower segments 16 in one of the series 15 engages the second hook 20 of one of the tower segments 16 in another of the series 15 as each of the series 15 is unrolled. For example, referring to FIG. 26A, which illustrates a portion of series 15a, 15b, and 15c partially unrolled, first hook 19ae and first hook 19af, which are located at the upper and lower portion, respectively, of the left portion of tower segment 16ae, are engaged with second hook 20be and second 20bf of the corresponding tower segment 16be. Similarly, hook second 20ae and second 20af, which are located at the upper and lower portion, respectively, of the right portion of tower segment 16ae, are engaged with first hook 19ce and first hook 19cf of the corresponding tower segment 16ce. Also similarly, first hook 19be and first hook 19bf, which are located at the upper and lower portion, respectively, of tower segment 16be, are engaged with second hook 20ce and second 20cf of the corresponding tower segment 16ce. Each series of pivotally interconnected tower segments 15a, 15b, and 15c, is attached to the respective hub assembly 21a, 21b, and 21c, respectively, which is supported by the hub support apparatus 29a, 29b, and 29c, respectively (FIG. 22). Each series of pivotally interconnected tower segments 15a, 15b, and 15c, rotates generally about a hub axis 22a, 22b, and 22c, respectively, as each series 15a, 15b, and 15c is unrolled in concert, with serieswise engagement of corresponding tower segments 16ae, 16be, and 16ce, followed by corresponding tower segments 16af, 16bf, and 16cf, followed by corresponding tower segments 16ag, 16bg, and 16cg, and so forth, until tower segments 16aa-16an, 16ba-16bn, and 16ca-16bn are engaged with the corresponding segments, with the corresponding first hooks 19aa-19an engaging with the corresponding second hooks 20aa-20an, and forming the tower structure illustrated, which extends upward as tower 14 is thereby assembled and extended. As each tower segment 16 of one of the series 15 is engaged with corresponding tower segments 16 of each of the other series 15 by engagement of corresponding first hooks 19 and second hooks 20, the three tower segments together define a tower story 38. As each tower segments 16 of each of the series 15 are similarly engaged and assembled with corresponding tower segments 16 of each of the other of the series, tower stories 38a-38n are assembled. The tower vertical axis 39 is also the axis of each tower story 38 when each tower story 38 is assembled and the tower 14 is assembled and extended. Each of the series 15 (15a, 15b, 15c) is preferably attached to the respective hub assembly 21 (21a, 21b, 21c) which is supported by a respective hub support apparatus 29 (29a, 29b, 29c) which accommodates movements of the respective series 15 as the segments pivot to roll up or unroll the series 15. As each series 15a, 15b, 15c is unrolled in concert, the first shank portion 23 of the first hook 19 of corresponding tower segments 16 rotates with respect to the corresponding first shank aperture 25 of the adjacent tower segment 16 and the second shank portion 26 rotates of the second hook 20 rotates with respect to the corresponding second shank aperture 28 of the adjacent tower segment 16, with the adjacent tower segments 16 thereby pivoting with respect to each other as each of the series 15 are unrolled. By this pivoting of adjacent tower segments 16 within each of the series 15 and the engagement of the first hook 19 and second hook 20 of corresponding tower segments 16 of corresponding series 15, the tower 14 is extended upwardly as the segments 15 are unrolled. In the opposite functionality, the tower 14 is lowered or retracted as the series are rolled up. Preferably, the tower 14 can be raised or extended, or lowered or retracted, various amounts, as desired for the particular application and location. More preferably, the tower 14 extension and retraction are continuously variable, allowing for any amount of extension, within the limit of the total height of the tower 14 as limited by unrolled length of each of the series 15.

Each tower segment (16aa-16an, 16ba-16bn, 16ca-16bn) preferably includes an extended series of engagement features or rack (30aa-an, 30ba-bn, 30ca-cn).

The mobile tower having support system 10 preferably includes a motor and gearing assembly 31 which drives the extension and retraction of the tower 14 by engagement with the tower segments 16 by way of the respective rack 30. The mobile tower having support system 10 preferably includes a control system 32 which controls the motor and gearing assembly 31 to extend and retract the tower 14 as desired.

There are many situations in which the mobile tower with support system 10 can be advantageously utilized to support a payload 6 a distance above the ground, such as to support a communication antenna, lighting, camera or other monitoring equipment, surveying or reconnaissance equipment, or for supporting personnel, for example. The present invention is particularly advantageous for situations in which rapid deployment of a tower offers benefit, such as for rapid response at a location affected by a weather event or other disruptive situation or equipment failure, or when rapid deployment offers a strategic advantage in a law enforcement or military action, for example. Various types and configurations of payload support apparatus 33 can be utilized as appropriate, such as those illustrated herein, or as needed for attaching or supporting the particular payload 6 on the tower 14.

By way of illustration, some example embodiments of the invention can be characterized by the following specifications and selected instructions for use of the mobile tower having support system 10.

Additional and alternative descriptive terminology is as follows. The series of interconnected tower segments 15, when rolled up onto the respective hub assembly 21, can be called a bale. A portion of the motor and gearing assembly 31, the portion including a centrally mounted drive system including a gear set which drives the three sides of the tower 14 and a motor can be called a lift center and transmission. A portion of the mobile tower having support system 10 located proximate the tower segments 16 of the respective series 15 as they are engaging with corresponding tower segments 16 to form a tower story 38 as described herein, which maintains alignment of tower segments 16 as the tower 14 is raised (extended upward) and lowered (retracted), and may also include safety and control elements such as limit switches, can be called a reaction ring. A portion of the tower segment 16 which includes the first shank aperture 25 or the second shank aperture 28, can be called a hinge blade, and is preferably hardened steel. The control system 32 may include a portion called the control box which houses at least a portion of the control center for the mobile tower having support system 10. The mobile tower having support system 10 may include a safety system which monitors the status of the bales during operation and triggers the control system 32 to halt operation (extension or retraction of the tower 14) automatically when a malfunction is detected, which can be called a bale monitoring system. The mobile tower having support system 10 may include a safety system which monitors the tower operation during retraction of the tower 14 to prevent accidental damage due to guy wires 88, rigging apparatus 85, payload 6, payload support apparatus 33, or other attachments to the tower 14 being lowered through the work platform 11 or interfering with other portions of the mobile tower having support system 10 as the series 15 are rolled up, and also provides a manual emergency stop which can be activated by personnel which may be on the work platform 11, which can be called a mast interference system. The system of guy wires 88, come-alongs 89, rigging apparatus 85 (if used) and other portions of the rigging system 84, and may include steel wire ropes, chains, hooks, and tensioning equipment for use in securing the tower 14 in high winds, can be called a guy wire system. A portion of the control system 32 which includes actuators for manual control of the motor and gearing assembly 31 to raise (extend upward) and lower (retract) the tower 14, and may also include an emergency stop actuator which trips a shut trip breaker to disconnect power to the control system 32 and the motor and gearing assembly 31 and preferably is configured with a cable to allow an operator to actuate the actuators for manual control from various positions, can be called a tower control pendant. Switches, which are preferably part of the mobile tower having support system 10 and which interact with the mast interference system and located proximate the reaction ring to stop the operation of the tower 14 (raising or lowering) to control minimum (fully retracted) or maximum (fully extended) or maintenance stop locations, can be called limit switches. Sensors which are preferably located proximate the reaction ring and which interact with portions of the control system 32 and monitor the position of tower segments 16 to ensure proper engagement or disengagement of corresponding tower segments 16 of a tower story 38 to verify operation of the tower 14, can be called proximity sensors. A portion of the control system 32 which provides a at least one of battery, generator, and line power (shore, or power grid plug-in) and power management to control and prioritize usage from batter, generator, and line power sources, can be called a hybrid power system. A programmed tower stopping height which allows for convenient access for maintenance of the payload 6 or rigging system 84 while the payload 6, payload support apparatus 33, rigging apparatus 85, or other portions of the rigging system 84 or other equipment is mounted to the tower 14, can be called a maintenance height. The control system 32 may include connections such as for power, Ethernet or other communication, timers, status indicators, connector for a tower control pendant, generator controllers, circuit breakers, emergency stop or e-stop, fault reset actuator, or other indicator or control elements.

Some embodiments have the following example specifications. Stowed dimensions (such as when compactly secured on the trailer 35) width about 102 inches, length about 300 inches, height about 138 inches. Fully extended height about 80 feet (additional payload elements may extend further). Payload capacity about 2000 pounds. Tower gross weight about 15,500 pounds, plus the weight of any payload 6 or payload support apparatus 33. Wind rating when fully deployed and extended about 90 miles per hour. Wind rating when stowed, compactly secured on the trailer 35, about 120 miles per hour. Maximum payload sail area about 102.7 square feet. Time to fully extend the tower 14 (elevate the mast) about 5 minutes. Time to fully retract the tower 14 (lower the mast) about 5 minutes. Sensors to confirm stowed position and maximum extension. Operating temperature about minus 20 degrees to about 150 degrees Fahrenheit. Storage temperature about minus 20 degrees to about 150 degrees Fahrenheit. Humidity tolerance at least 95% (non-condensing). Minimum IP14 rated (provide a degree of protection against falling dirt, rain, sleet, and snow, and being undamaged by external formation of ice; any ice or snow should be removed prior to operation). Tower operating voltage 240 volts AC single phase, plus or minus 10%. Minimum operating current 30 amperes. Heavy duty trailer, rated 10,000 pounds, tandem axles with spring suspension, electronic brakes, and adjustable hitch. Four drop leg trailer leveling jacks with 16 inch jack pads including a grounding jack pad, eight bubble levels located near trailer leveling jacks, adjustable to accommodate about 10 degree topographical variation. Four outriggers with multi-tube swing-out and telescoping outrigger assemblies which allow the tower to be raised and used in moderated side wind conditions without the use of guy wires and during guy wire installation, with outrigger drop-leg jacks and jack pads. Multiple sensors for monitoring correct tower assembly and bale roll-up, raise and lower fault lights, reaction ring pressure sensor plate to prevent lowering of the tower to prevent tower damage or operator injury during lowering, and indicators to identify fault conditions. Eight guy wire assemblies, including wire rope, tower attachment hooks and frame, and tensioning device (i.e. come-along) and tension gauge. In some embodiments, the outrigger first portion 44 has a length of about 56 inches, the outrigger second portion 46 has a length of about 103 inches, the outrigger third portion 48 has a length of about 84 inches, the strut first portion 62 has a length of about 66 inches, the strut second portion 64 has a length of about 66 inches, and the strut third portion 66 has a length of about 66 inches.

Selected steps for operating some embodiments of the mobile tower having support system 10 include the following. Place jack pads under the leveling jacks 37, with the grounding jack pad under the driver's side rear leveling jack, connect the grounding wire to the trailer grounding lug, connect the site ground to the lug, install grounding rods in the ground and connect to the trailer grounding lug. For each leveling jack 37, pull the pin to release the jack from the stowed position and rotate the jack to the vertical position and replace the pin. Place a jack pad under each leveling jack 37 (with the grounding jack pad located under the driver's side rear leveling jack 37c). For each leveling jack 37, pull the "drop jack" pin out of the drop leg of the leveling jack and let the drop leg fall until it engages the jack pad or reaches the end of travel, and reinstall the respective drop jack pin. Use the leveling jack to level the trailer 35 by turning cranks on the respective leveling jack and referring to the bubble levels, raising the leveling jacks 37 enough to reduce the weight on the trailer tires, but leaving enough weight on the trailer tires to prevent rotation of the tires. Remove the strut first telescoping pin 63*p* and the strut second telescoping pin 65*p*, and deploy each of the outriggers 40, by first removing the stow pin 58 and the locking pin 57 (the 45-degree pin), unlocking the latch 42 (the stow clamp), support and pull the foot portion 50 to rotate the outrigger first portion 44 and the outrigger second portion 46 into a 45 degree position with respect to the trailer by pivoting the outrigger first pivoting joint 43 and the outrigger second pivoting joint 45, and replace the locking pin 57 and the stow pin 58 to lock the outrigger 40 in position; pull the outrigger telescoping pin 47*p* and extend the outrigger third portion 48 from the outrigger second portion 46 until it stops, and replace the outrigger telescoping pin 47*p*; adjust vertical position of the outrigger 40 using the brace winch 75 so the foot jack 51 is close to the ground; adjust the orientation of the foot portion 50 by removing the foot pivot pin 49*p* and pivoting the foot pivoting joint 49 so that the foot jack 51 is oriented perpendicular to the ground 2 and replacing the foot pivot pin 49*p* in one of the holes at the foot pivoting joint 49 to secure the foot pivoting joint 49, and further adjust the winch 75 if needed; replace the strut first telescoping pin 63*p* and the strut second telescoping pin 63*p* to secure the strut first telescoping joint 63 and the strut second telescoping joint 65, respectively, adjusting the winch 75 a small amount if needed; place jack pads under the foot jack 51, actuate the drop leg pin mechanism 53 to allow the drop leg 52 to fall until it engages the jack pad, and adjust the foot jack 51 so the drop leg firmly engages the ground 2. Connect shore power (if used) and start up the hybrid power management system, plug in the tower control pendant, adjust the controls to power the tower, verify the indicators of the control system 32 indicate proper status, and ensure all safety procedures and checks have been performed, and actuate the control system 32 to extend the tower 14 a short distance (such as 2-6 feet, or to the maintenance height) and raise the safety rails. With the tower 14 extended to a convenient height, ascend a ladder to check the upper portion of the tower 14 and install or adjust the payload support apparatus 33, the payload 8, and install the lightning system. Raise the tower to the maintenance height and assemble and attach the rigging apparatus 85 to the tower 14 by installing each respective securement apparatus 86 at the desired location on the tower 14 (with each tooth 93 engaging the respective rack 30); attach each guy wire 88 to the respective guy wire upper attachment feature 87 and extend each guy wire 88 away from the tower with 2 guy wires 88 aligning generally towards each outrigger 40 according to the general layout illustrated in FIG. 23A, and install a lightning cable standoff. Raise the tower to full height, ensuring that the guy wires 88 do not get caught on anything, and use an orientation indicator such as a laser to ensure the tower 14 stays straight and vertical when the guy wires 88 are subsequently tightened and adjusted. Attach each come-along 89 to the respective guy wire 88 and the come-along attachment feature 90 on the outrigger 40 near the outrigger end 81, and adjust the tension in each guy wire 88 by actuating the respective come-along 89, ensuring that the tower remains vertical and adjusting the relative tension in the guy wires 88 as needed, until there is only a slight amount of sag in the guy wires 88. Use the tension measurement device 8 and the respective come-along 89 to tighten one of the guy wires 88 until the tension measurement device 8 registers a reading, and then use the tension measurement device 8 and the respective come-along 89 in each of the other guy wires 88 until the readings for all guy wires 88 are about equal, starting with a low tension; observe the orientation of the tower using the laser and continue to adjust the tension in each guy wire to obtain a similar tension reading indicating a tension within the desired range, for each guy wire 88, with the tower being vertical, and secure the come-alongs 89. Check the tension in each guy wire 88 after known wind events or after every 45 days to detect any stretching of the guy wires 88. When it is desired take down the tower 14 and compactly secure the mobile tower having support system 10 to the trailer 35, ensure all safety procedures and checks have been performed, and actuate the control system 32 to retract the tower 14 to a convenient height to access remove or adjust the payload support apparatus 33, the payload 8, remove the lightning system, disengage the guy wires 88 from the guy wire upper attachment features 87, and remove the rigging apparatus 85 from the tower 14. After removing any equipment which may interfere with proper retraction of the tower 14 and rolling up of the series of interconnected tower segments 15, lower the tower 14 to the stowed position and power down the control system 32 to prevent inadvertent actuation of the motor and gearing assembly 31 and any actuation of the tower 14. Remove and stow the guy wires 88 and come-alongs 89, and compactly secure each outrigger 40 for transport, following the reverse of the procedure used to deploy each outrigger 40. Prior to transport, raise and stow each leveling jack 37.

Preferably, the motor and gearing assembly 31 includes manual crankdown apparatus including a brakemotor, a brake, a brakemotor shaft, a drive socket, and a brake release handle; the manual crankdown apparatus provides for controlled lowering of the tower 14 under its own weight, with a brake operated by a brake handle to limit the speed, until the tower 14 stops lowering; the last amount of crankdown is achieved by using a drive socket to turn the brakemotor shaft the remaining amount, using a portable electric drill for assistance if desired.

Figure 28:
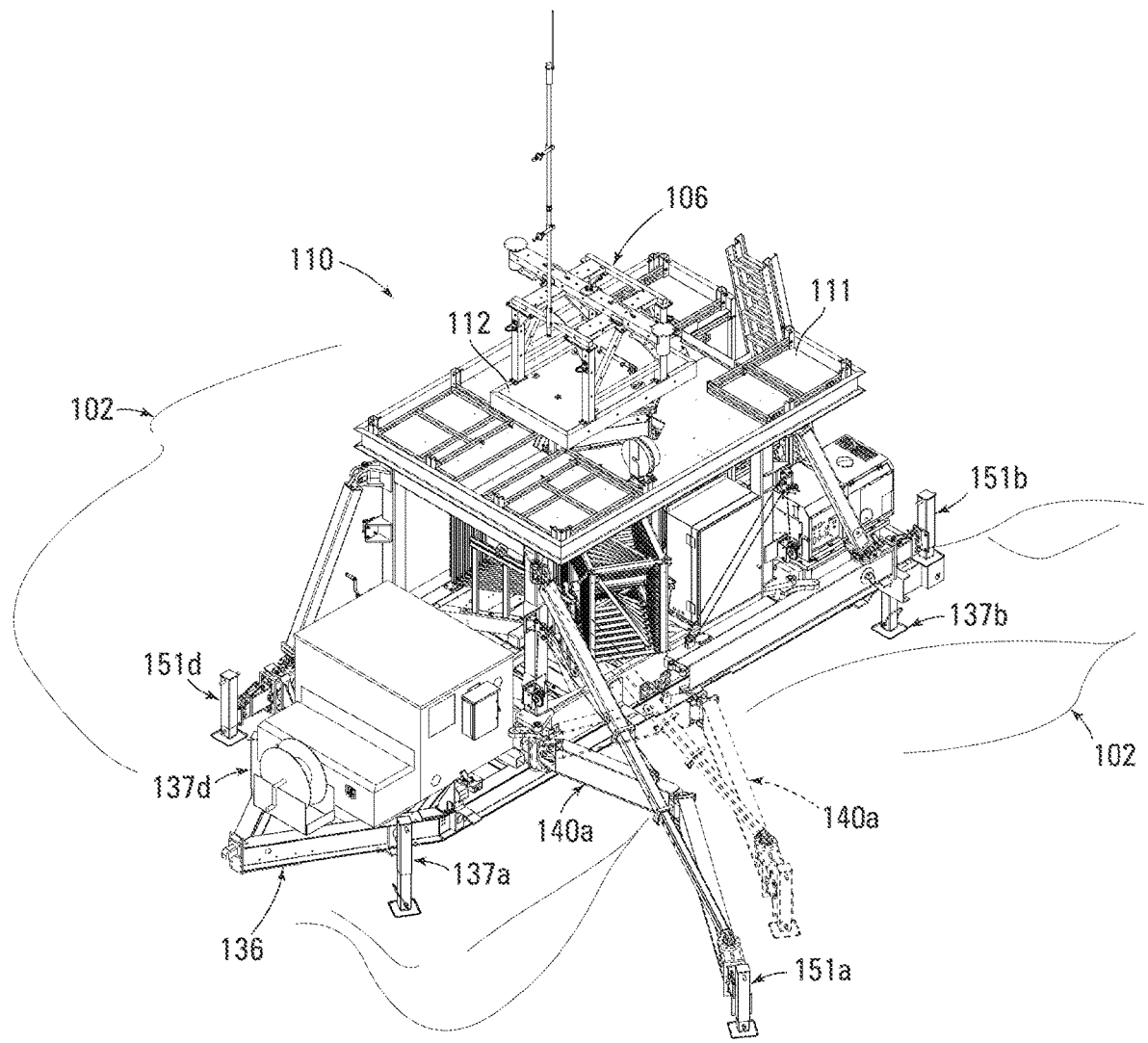

Referring now to FIG. 28, a tower or a tower with support system 110 is shown. The tower 110 can be configured and arranged for transport to a location and for rapid deployment at the location, but it is built on a frame 136 that does not have wheels and is not a trailer, as opposed to the tower with support system 10 that is includes a trailer 35, as shown in FIG. 1. Referring now further to FIG. 28, the tower with support system 110 includes a frame 136 having a plurality of outriggers 140 that are preferably compactly secured to the frame 136 for transport so that the tower 110 can be moved from place to place. The tower with support system 110 includes an extendable and retractable tower 114, a frame 136 and a plurality of outriggers 140 (individually referred to as items 140*a*, 140*b*, 140*c*, 140*d*), which are compactly secured to the frame 35. The frame 136 does not have wheels 34, but it has essentially all of the other parts or features of the mobile tower 10, disclosed herein above and in drawing FIGS. 1-26, except that the frame 136 is not a trailer and it does not have wheels. It will be appreciated that there are many situations in which such a tower can be advantageously utilized to support a payload 106 a distance above the ground, such as to support a communication antenna, lighting, camera or other monitoring equipment, surveying or reconnaissance equipment, or for supporting personnel, for example, and that such a tower 110 need not be on a trailer or other mobile platform as the mobile tower 10, shown in FIGS. 1-26, is. The present invention is particularly advantageous for situations in which rapid deployment of a tower offers benefit, such as for rapid response at a location affected by a weather event or other disruptive situation or equipment failure, or when rapid deployment offers a strategic advantage in a law enforcement or military action, for example, but it will also be appreciate that the alternate tower 110 will also be helpful under other circumstances where mobility is not an essential requirement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A mobile tower for transportation to and rapid deployment at remote sites where the mobile tower is configured and arranged to be engaged with the ground, the mobile tower comprising:
   an extendable and retractable tower secured to a mobile support structure; the mobile support structure including a frame; the mobile support structure including a plurality of deployable outriggers for ground engagement; wherein the outriggers are configured and arranged to be compactly secured to the frame during transportation to such remote sites and deployed to stabilize the extendable and retractable tower at such remote sites; wherein the extendable and retractable tower includes three series of pivotally interconnected tower segments; wherein tower segments in each of the respective series of pivotally interconnected tower segments engage with tower segments in each of the other two of the three series of pivotally interconnected tower segments when the extendable and retractable tower is assembled such that one tower segment from each of the three series of tower segments will be engaged with one tower segment of each of the other two series of pivotally interconnected tower segments to form one of a series of tower stories, each including three tower segments;
   the mobile tower further including a plurality of guy wires, wherein the plurality of guy wires are each secured to the extendable and retractable tower and to one of the respective plurality of outriggers to stabilize the extendable and retractable tower when the extendable and retractable tower is assembled; wherein the plurality of guy wires includes first and second guy wires, each of which is secured to the same one of the plurality of outriggers, and also secured to the extendable and retractable tower in first and second spaced apart positions proximate a first tower story.

2. The mobile tower of claim 1, wherein the plurality of guy wires includes a third guy wire and the plurality of outriggers includes first and second outriggers which are adjacent to one another, wherein the first guy wire is secured to the first outrigger and the third guy wire is secured to the second outrigger and the first and third guy wires are each secured to the extendable and retractable tower in close proximity to one another on the extendable and retractable tower.

3. The mobile tower of claim 1, further comprising a first rigging apparatus including attachment features for attachment of more than 3 guy wires.

4. The mobile tower of claim 3, wherein the extendable and retractable tower and the first rigging apparatus are configured and arranged to attach to and detach from one another when the extendable and retractable tower is partially extended to a maintenance height.

5. The mobile tower of claim 3, further including a second rigging apparatus including attachment features for attachment of more than 3 guy wires.

6. The mobile tower of claim 5, wherein the first rigging apparatus is configured and arranged to attach to and detach from the extendable and retractable tower proximate the first tower story, and the second rigging apparatus is configured and arranged to attach to and detach from the extendable and retractable tower proximate a second tower story.

7. The mobile tower of claim 1, wherein the outriggers are pivotally secured to the frame; and wherein each of the outriggers includes a plurality of members and at least one of the plurality of members is telescopically expandable during deployment.

8. The mobile tower of claim 1, further comprising a pivotally attached bracing structure attached to one of the plurality of outriggers, wherein the bracing structure includes:
   a telescoping strut having a first strut end and a second strut end, the first strut end pivotally attached to one of the plurality of outriggers, and the second strut end pivotally attached to the frame; and
   a brace wire and a winch for raising and lowering the outrigger for ground engagement on uneven ground.

9. The mobile tower of claim 1, wherein tower segments in each of the respective series of pivotally interconnected tower segments engage with each of the other series of pivotally interconnected tower segments to define a tower axis, wherein the tower axis is generally vertical during transportation to such remote sites.

10. The mobile tower of claim 1, wherein each of the plurality of outriggers is pivotally interconnected to the frame, and wherein each of the outriggers includes first and second portions that are pivotally interconnected with one another to permit the first and second portions to fold together so that the first and second portions of each of the outriggers can be secured to the frame.

11. The mobile tower of claim 1, wherein the plurality of guy wires includes third and fourth guy wires, each of which is secured to the same one of the plurality of outriggers, and also secured to the extendable and retractable tower in first and second spaced apart positions proximate a second tower story.

12. The mobile tower of claim 1, further comprising a payload support apparatus.

13. The mobile tower of claim 1, further comprising a motor and gearing assembly.

14. The mobile tower of claim 13, further comprising a motor and gearing assembly control system.

15. The mobile tower of claim 1, further comprising at least 3 guy wire attachment features located in spaced apart positions proximate the same tower story and approximately equidistant from a tower vertical axis.

16. A method of erecting a mobile tower at a remote site on a ground, comprising the steps of:
   providing a remotely deployable mobile tower for transportation to and rapid deployment at remote sites where the mobile tower is configured and arranged to be engaged with the ground, the mobile tower including:

an extendable and retractable tower secured to a mobile support structure including a frame and a plurality of deployable outriggers for ground engagement; wherein the outriggers are configured and arranged to be compactly secured to the frame during transportation to such remote sites and deployed to stabilize the extendable and retractable tower at such remote sites; wherein the extendable and retractable tower includes three series of pivotally interconnected tower segments; wherein tower segments in each of the respective series of pivotally interconnected tower segments engage with tower segments in each of the other two of the three series of pivotally interconnected tower segments when the extendable and retractable tower is assembled such that one tower segment from each of the three series of tower segments will be engaged with one tower segment of each of the other two series of pivotally interconnected tower segments to form one of a series of tower stories, each including three tower segments;

the mobile tower further including a plurality of guy wires, wherein the each of the plurality of guy wires has a first end and a second end, wherein the first end of each respective guy wire attaches to the extendable and retractable tower and the second end of each respective guy wire attaches to one of the respective plurality of outriggers to stabilize the extendable and retractable tower when the extendable and retractable tower is assembled; wherein the plurality of guy wires includes first and second guy wires, each of which is secured to the same one of the plurality of outriggers, and each of which is also secured to the extendable and retractable tower in first and second spaced apart positions proximate a first tower story; transporting the mobile tower to a desired location;

deploying the plurality of outriggers; and extending the extendable and retractable tower.

17. The method of claim 16, wherein the plurality of guy wires includes third and fourth guy wires and the plurality of outriggers includes first and second outriggers which are adjacent to one another, wherein the third guy wire is secured to the first outrigger and the fourth guy wire is secured to the second outrigger and the third and fourth guy wires are each secured to the extendable and retractable tower in close proximity to one another on the extendable and retractable tower.

18. The method of claim 16, further comprising the steps of:

providing a rigging apparatus;

extending the extendable and retractable tower to a maintenance height;

attaching the rigging apparatus to the extendable and retractable tower; and attaching at least some of the plurality of guy wires to the rigging apparatus to thereby secure the guy wires to the extendable and retractable tower.

19. The method of claim 16, wherein the mobile tower further includes payload support apparatus, and including the step of using the mobile tower to support a payload a distance above the ground.

* * * * *